United States Patent [19]
Harrold et al.

[11] Patent Number: 5,969,850
[45] Date of Patent: Oct. 19, 1999

[54] SPATIAL LIGHT MODULATOR, DIRECTIONAL DISPLAY AND DIRECTIONAL LIGHT SOURCE

[75] Inventors: Jonathan Harrold, Sandford-on-Thames; Graham John Woodgate, Henley-on-Thames, both of United Kingdom

[73] Assignee: Sharp Kabushiki Kaisha, Osaka, Japan

[21] Appl. No.: 08/937,856

[22] Filed: Sep. 25, 1997

[30] Foreign Application Priority Data

Sep. 27, 1996 [GB] United Kingdom ............... 9620210

[51] Int. Cl.⁶ .................. G02F 1/29; G02B 27/26
[52] U.S. Cl. .............. 359/320; 359/296; 359/256; 359/619; 359/463; 359/465; 349/16
[58] Field of Search .................... 359/465, 463, 359/464, 466, 320, 619, 256, 296, 298; 349/15, 16

[56] References Cited

U.S. PATENT DOCUMENTS

| | | | |
|---|---|---|---|
| 4,478,494 | 10/1984 | Soref | 359/320 |
| 4,789,228 | 12/1988 | Le Pesant et al. | 359/320 |
| 5,122,888 | 6/1992 | Iizuka et al. | 359/54 |
| 5,191,472 | 3/1993 | Kurematsu et al. | 359/619 |
| 5,264,964 | 11/1993 | Faris | 359/465 |
| 5,461,495 | 10/1995 | Steenblik et al. | 359/463 |
| 5,465,175 | 11/1995 | Woodgate et al. | 359/643 |
| 5,541,642 | 7/1996 | Ashbey | 359/464 |
| 5,629,797 | 5/1997 | Ridgway | 359/464 |
| 5,850,269 | 12/1998 | Kim | 349/15 |

FOREIGN PATENT DOCUMENTS

| | | |
|---|---|---|
| 0540137 | 5/1993 | European Pat. Off. . |
| 0586098 | 3/1994 | European Pat. Off. . |
| 0721131 | 7/1996 | European Pat. Off. . |
| 0721132 | 7/1996 | European Pat. Off. . |
| 0726482 | 8/1996 | European Pat. Off. . |
| 19500699 | 7/1996 | Germany . |
| 3119889 | 5/1991 | Japan . |

OTHER PUBLICATIONS

Search Report for Application No. GB 9620210.6; Mailed Nov. 22, 1996.

Sanyo Announces Development of 10–Inch, "2D/3D Compatible Display", May 10, 1996.

D.G. McDonnell et al., SID 93 Digest, pp. 654–657, 1993, "An Ultra–High Resolution Ferroelectric Liquid–Crystal Video Display."

Primary Examiner—Loha Ben

[57] ABSTRACT

A spatial light modulator has a modulating region which is capable of operating in two modes in the first clear mode, the region is continuously and substantially uniformly transmissive. In a second or barrier mode, the region can be switched to form parallax barrier comprising slits which are separated by continuous opaque regions. Such A modulator may be used in association with an image liquid crystal display to provide an autostereoscopic 3D display having a 3D mode which may track movement of an observer and a 2D mode in which full resolution of the LCD is used.

32 Claims, 28 Drawing Sheets

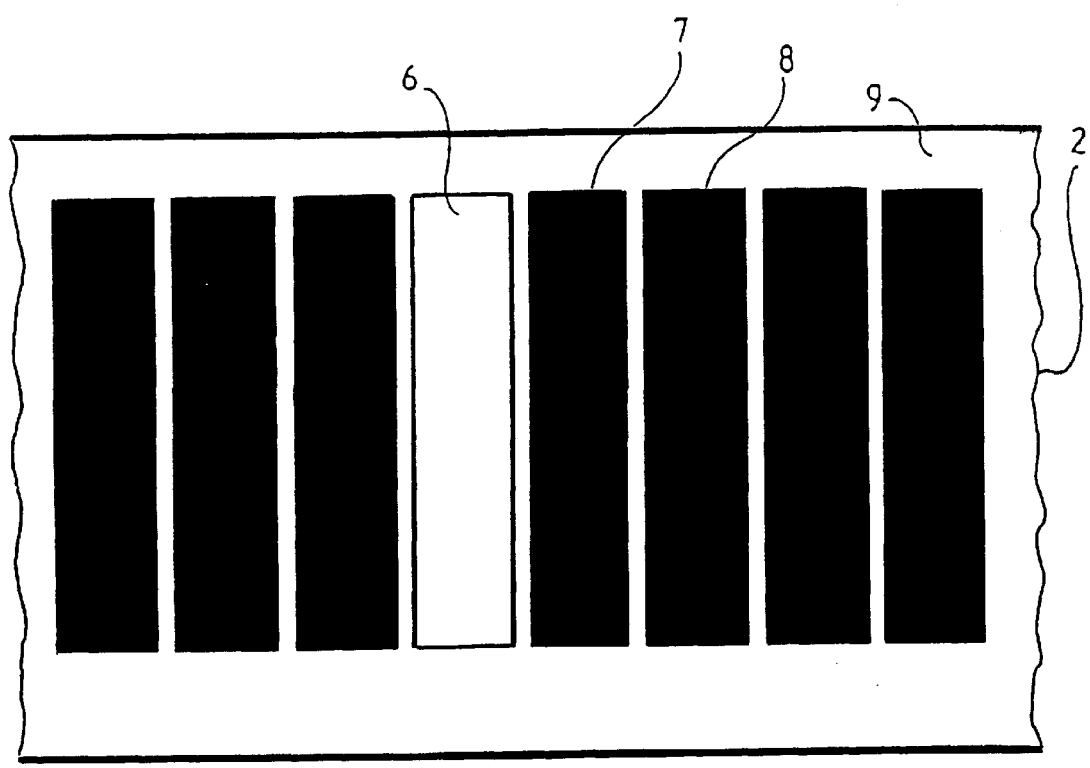
FIG 2
FIG 3
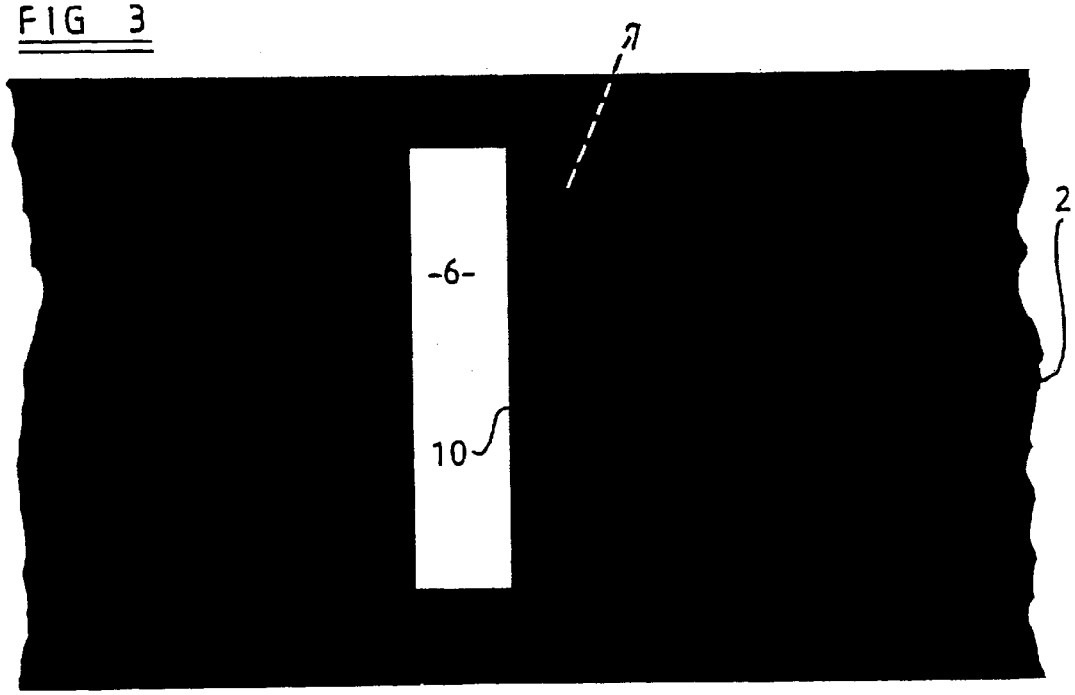

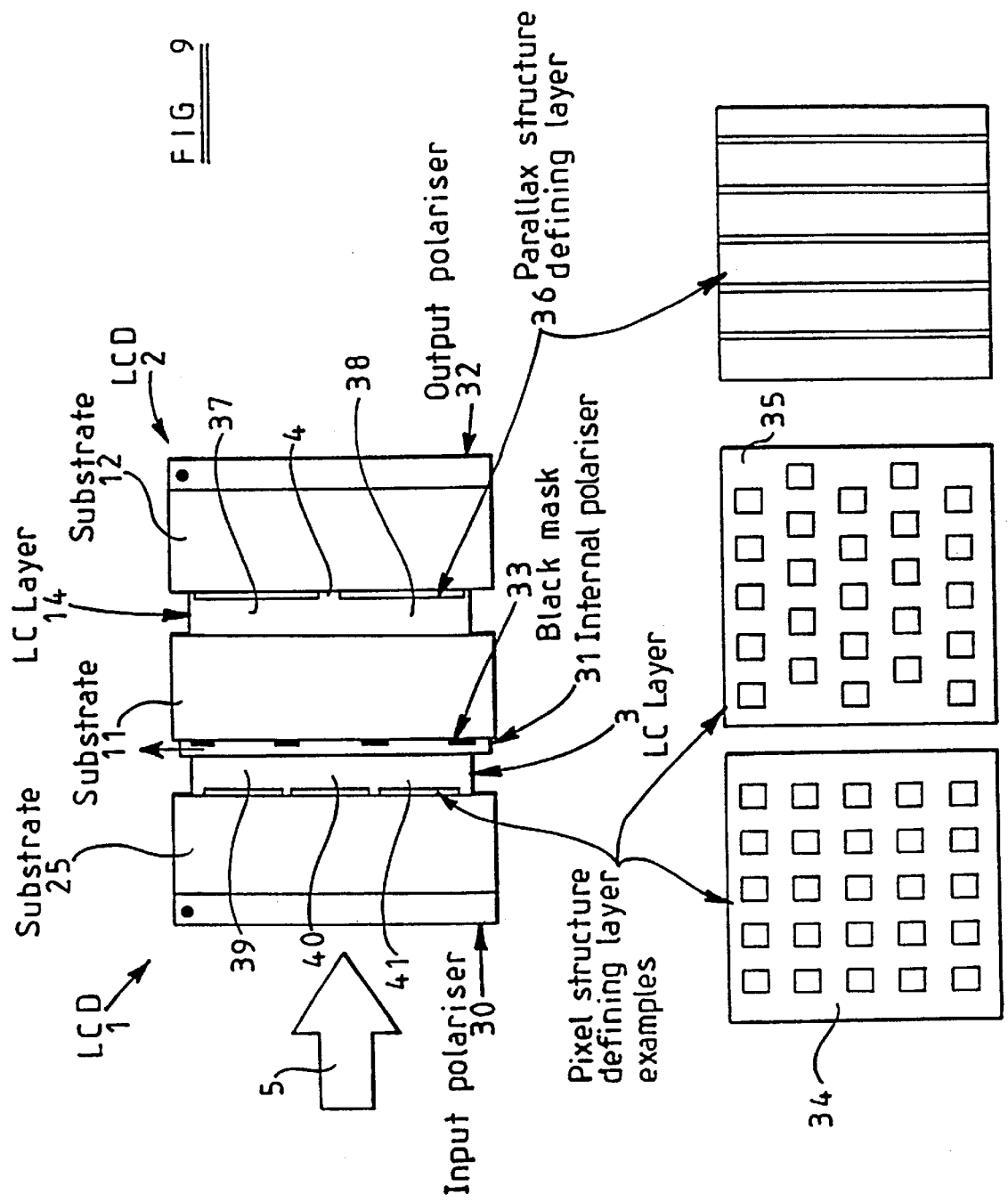

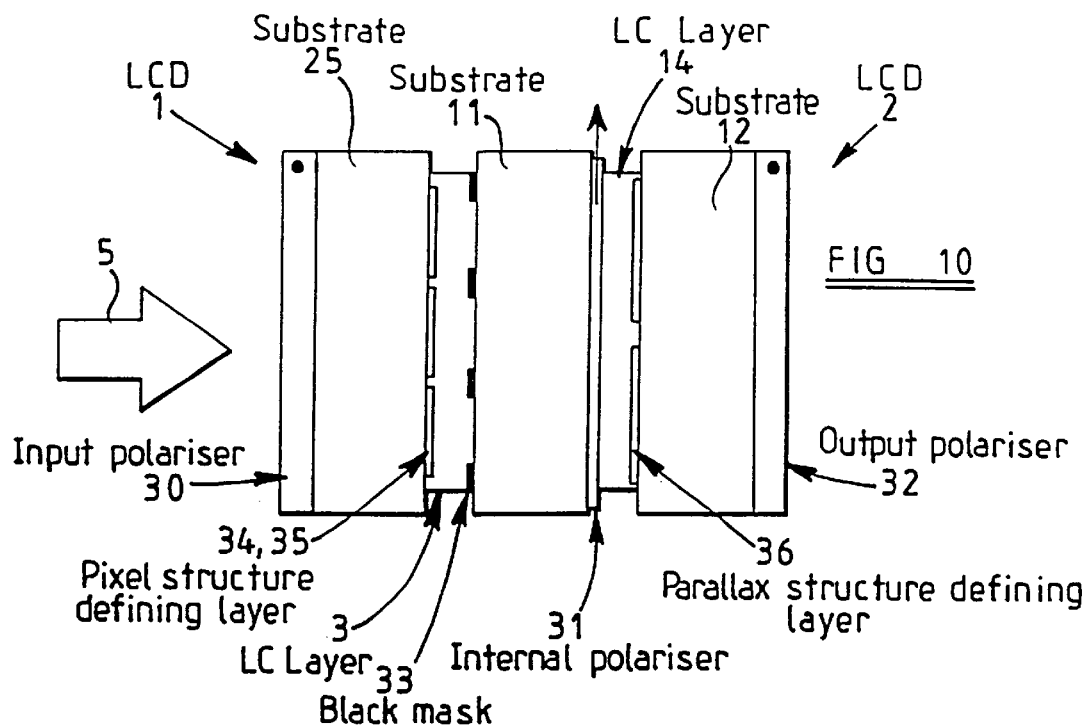
FIG 10
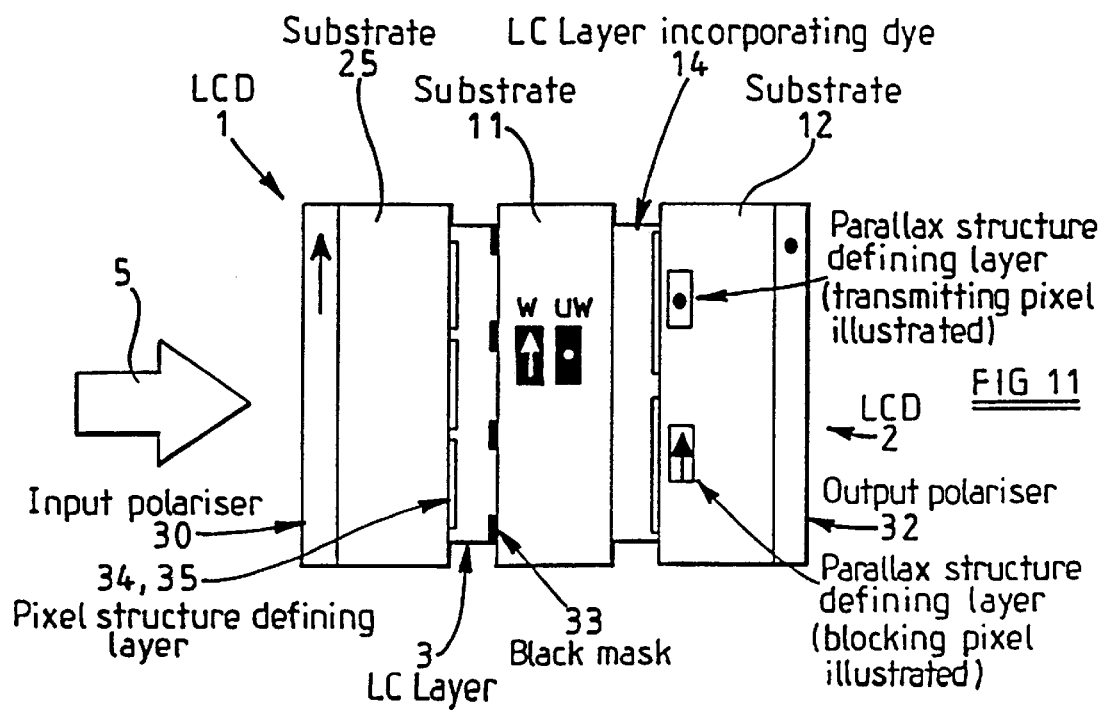
FIG 11
  Wanted and unwanted directions of polarised light
LC Dye absorption axis direction or polariser absorption direction

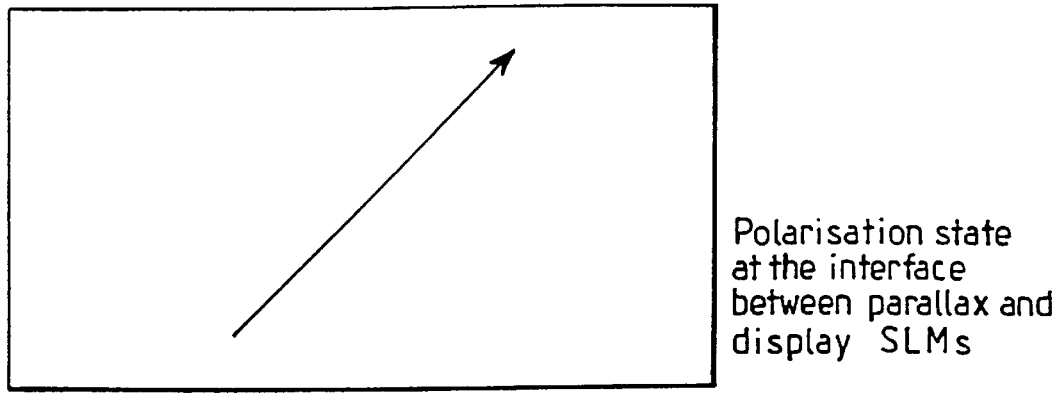
Polarisation state at the interface between parallax and display SLMs
FIG 12
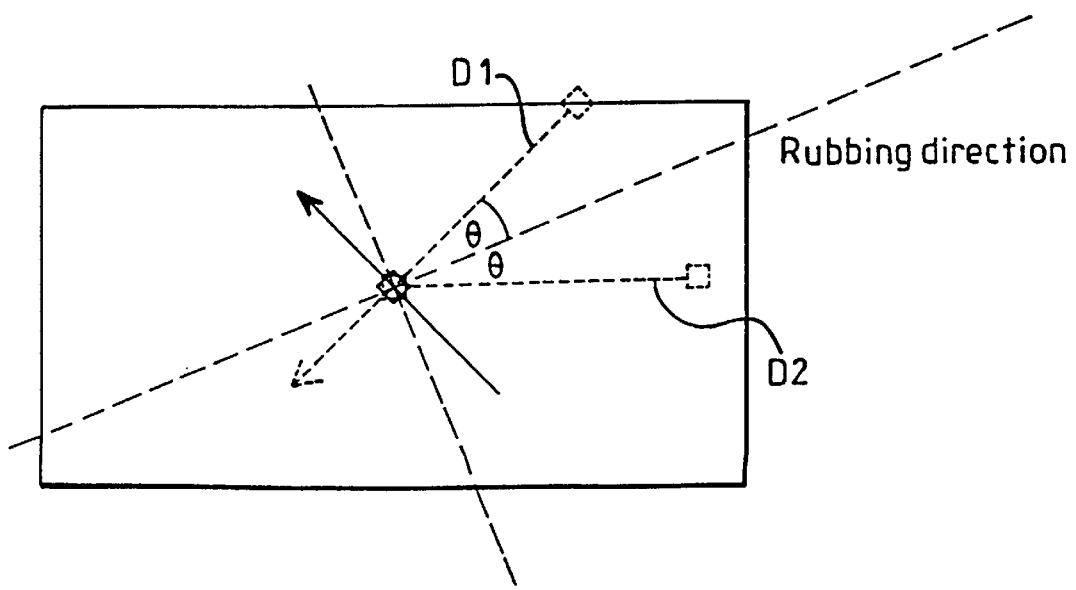

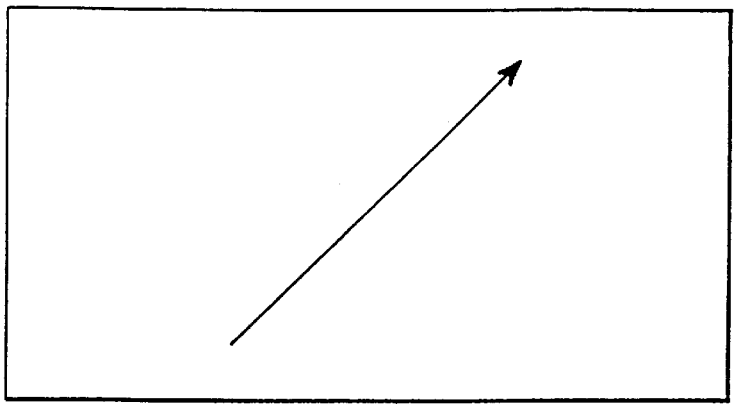
Polarisation state at the interface between parallax and display SLMs
FIG 13
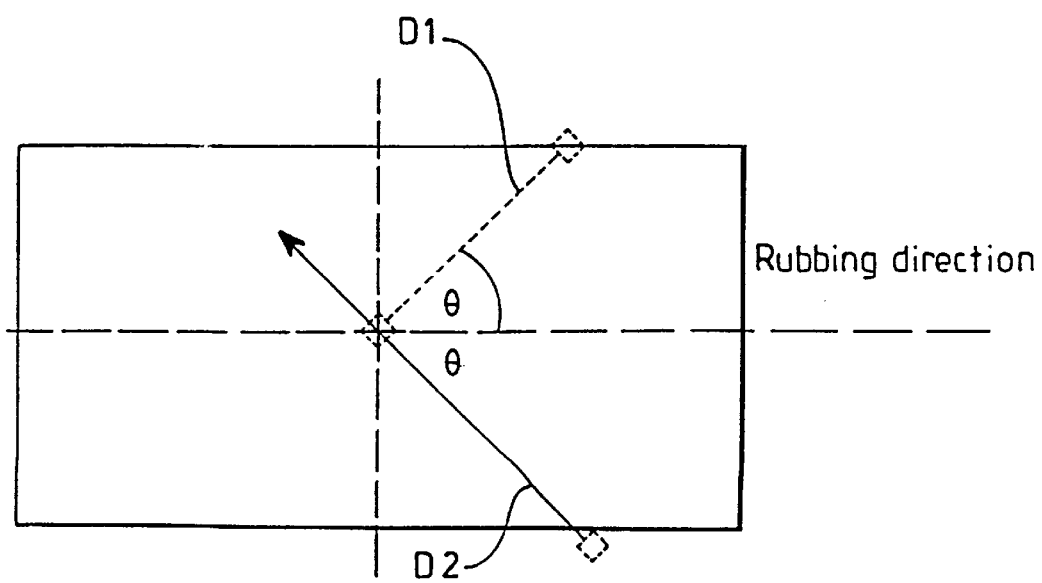
Rubbing direction

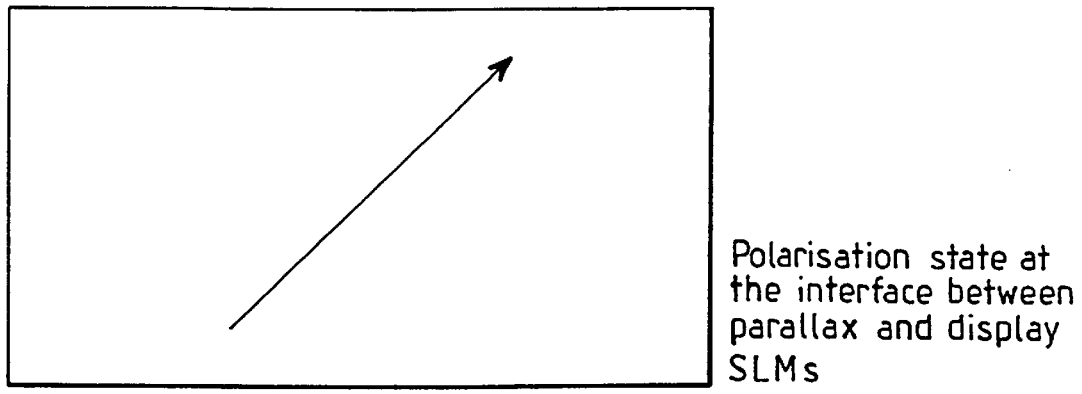
Polarisation state at the interface between parallax and display SLMs
F I G 14
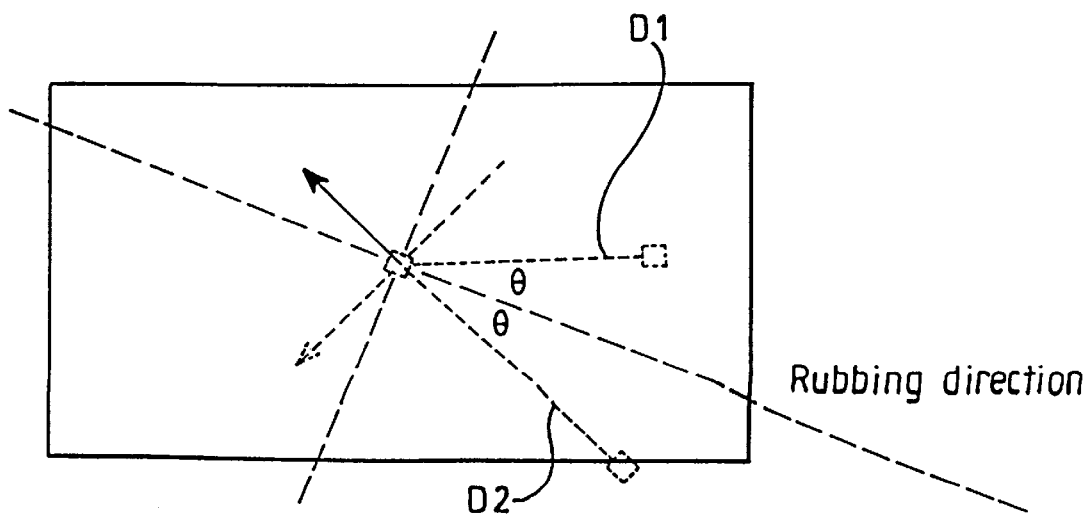

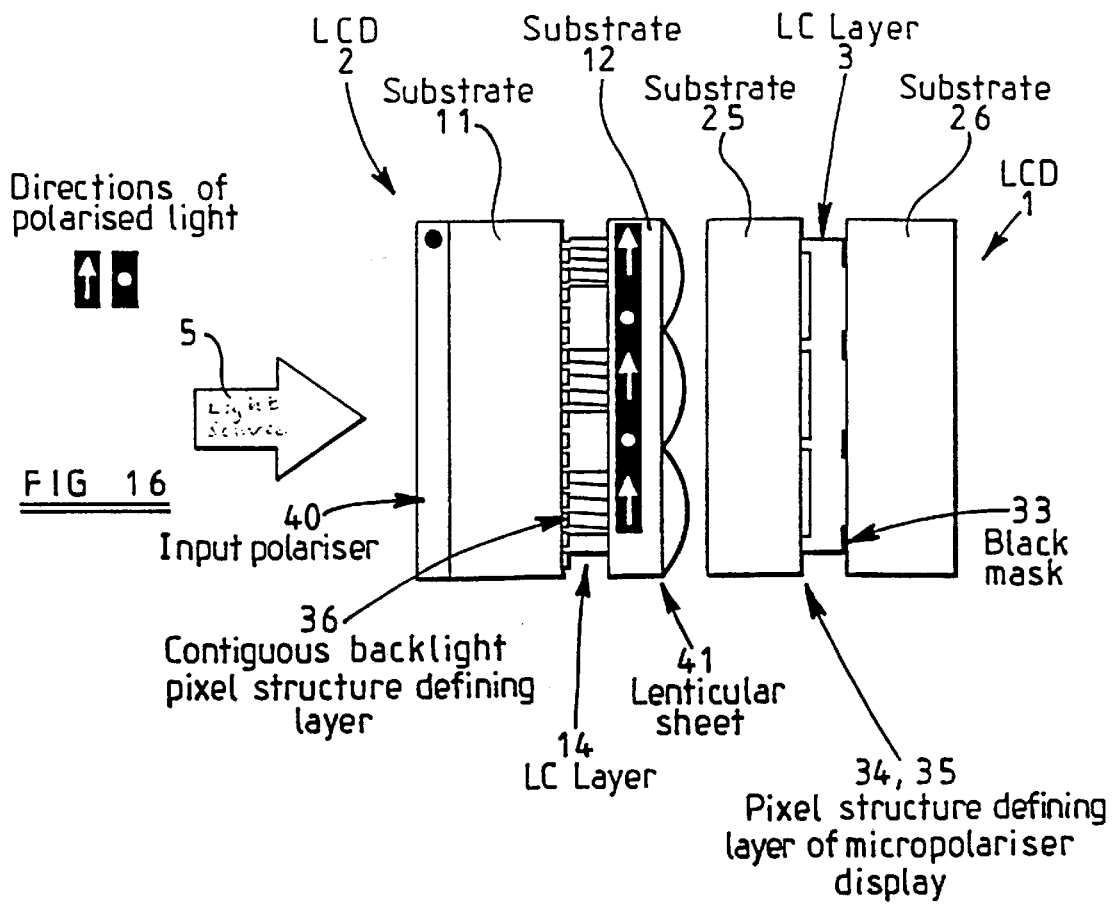
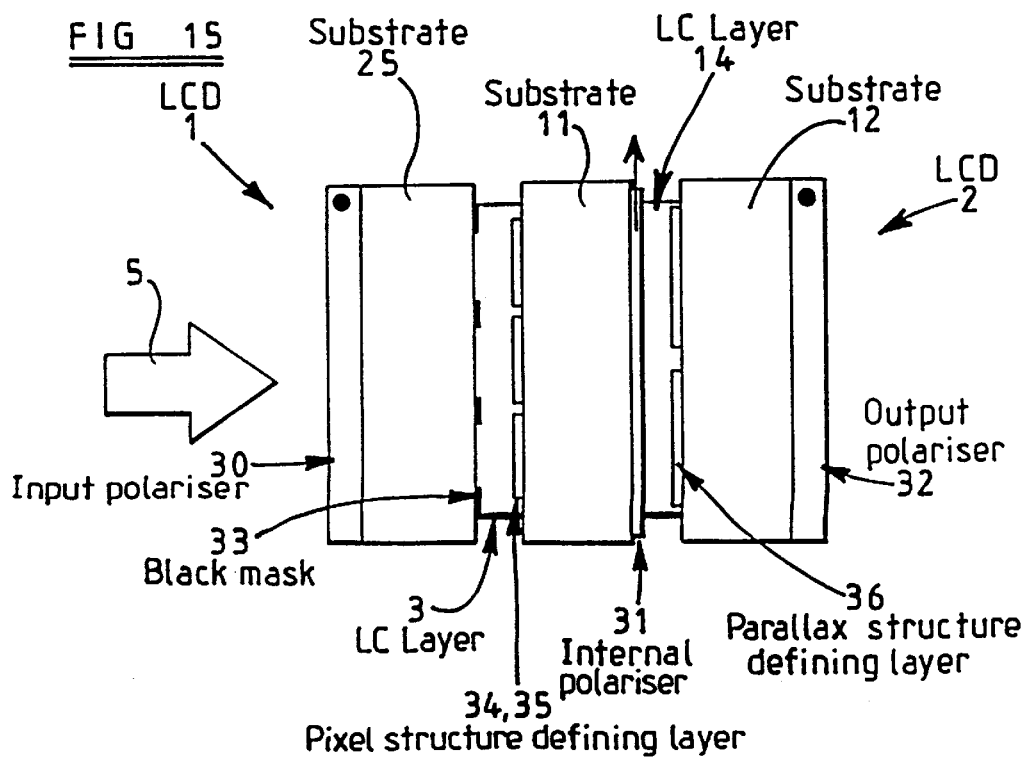

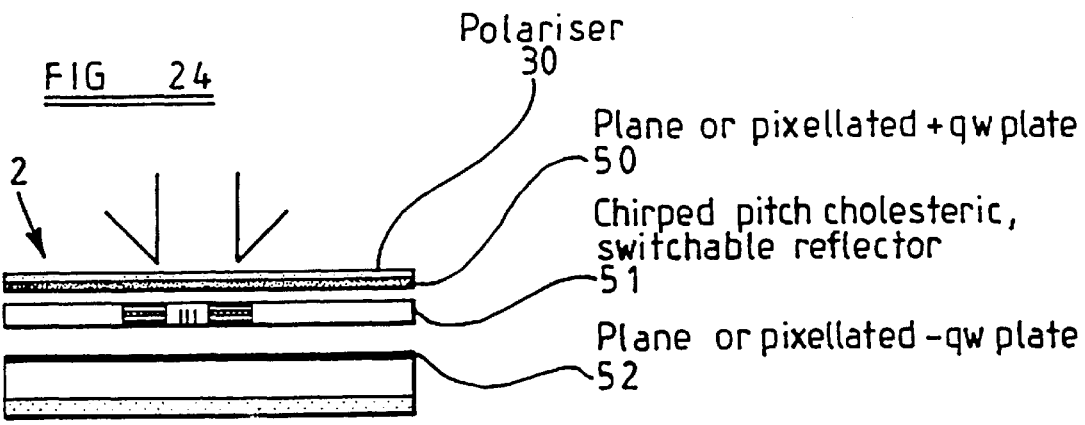
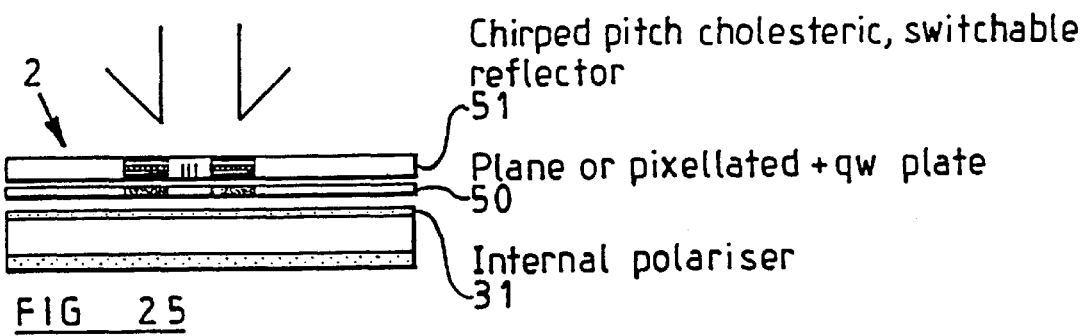
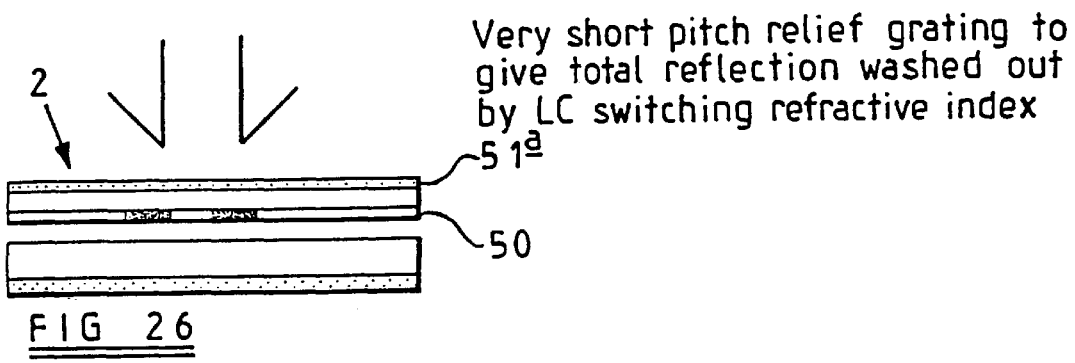

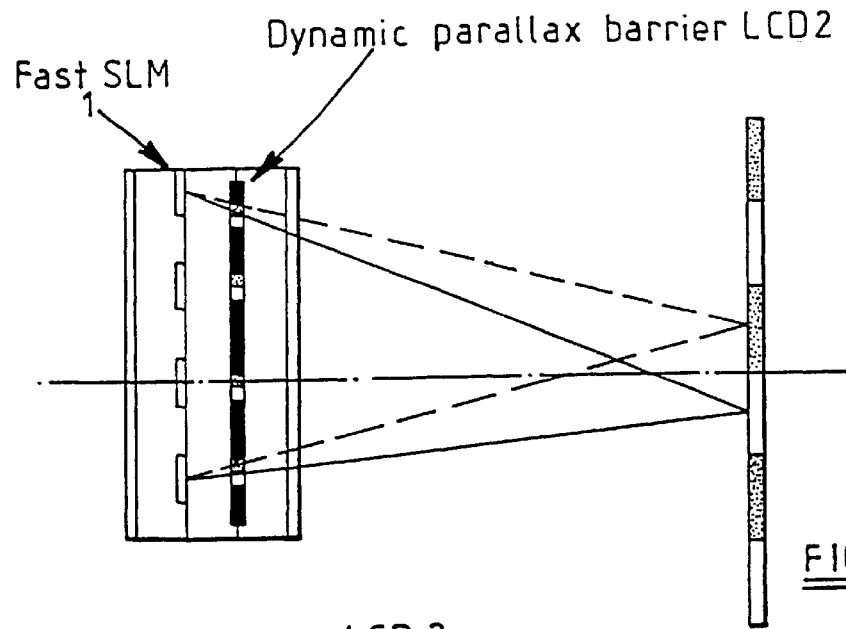
FIG 31
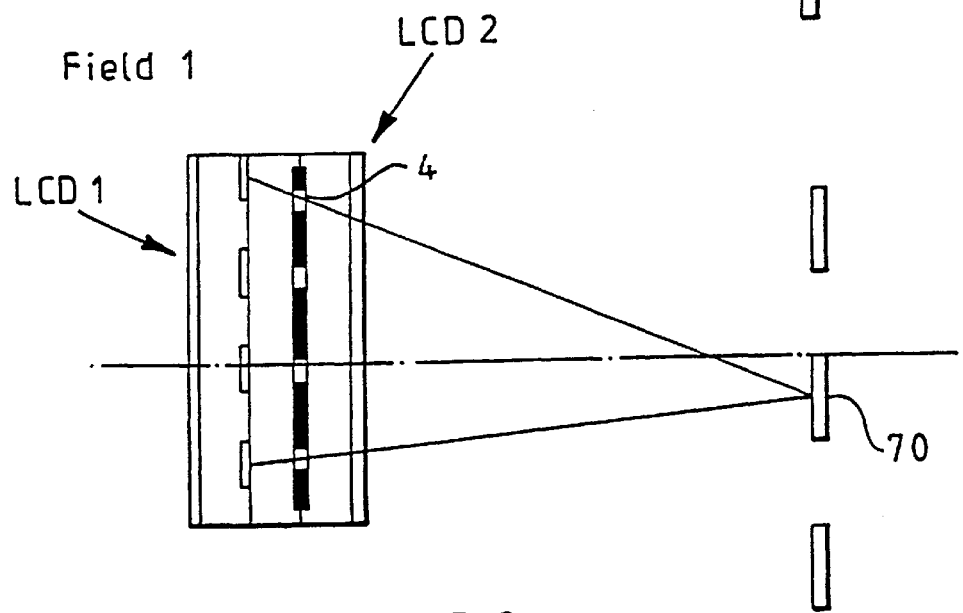
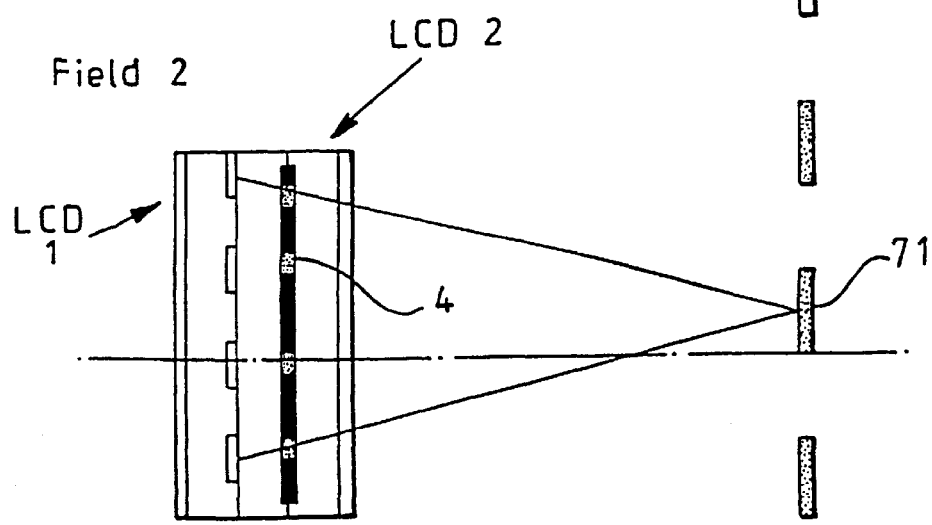

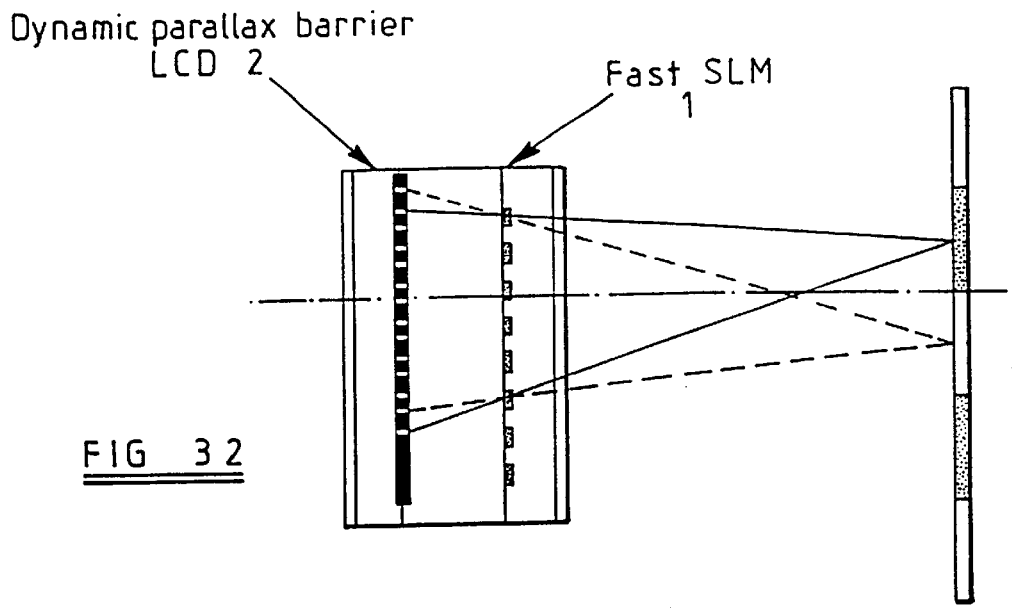
Dynamic parallax barrier LCD 2
Fast SLM 1
FIG 32
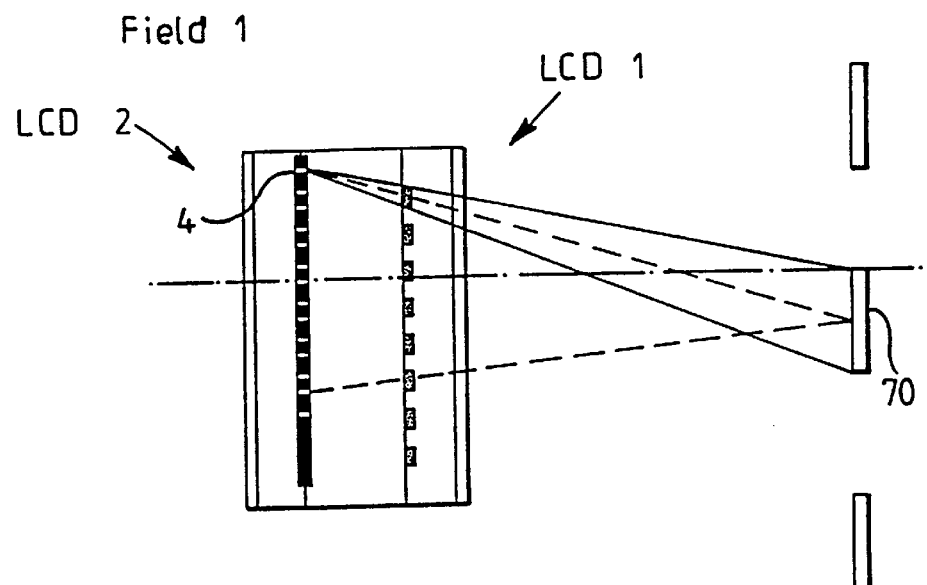
Field 1
LCD 2
LCD 1
4
70
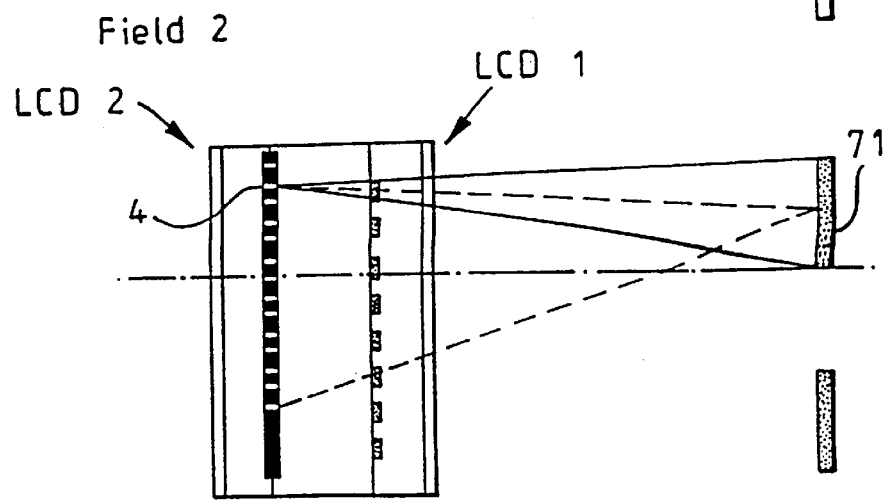
Field 2
LCD 2
LCD 1
4
71

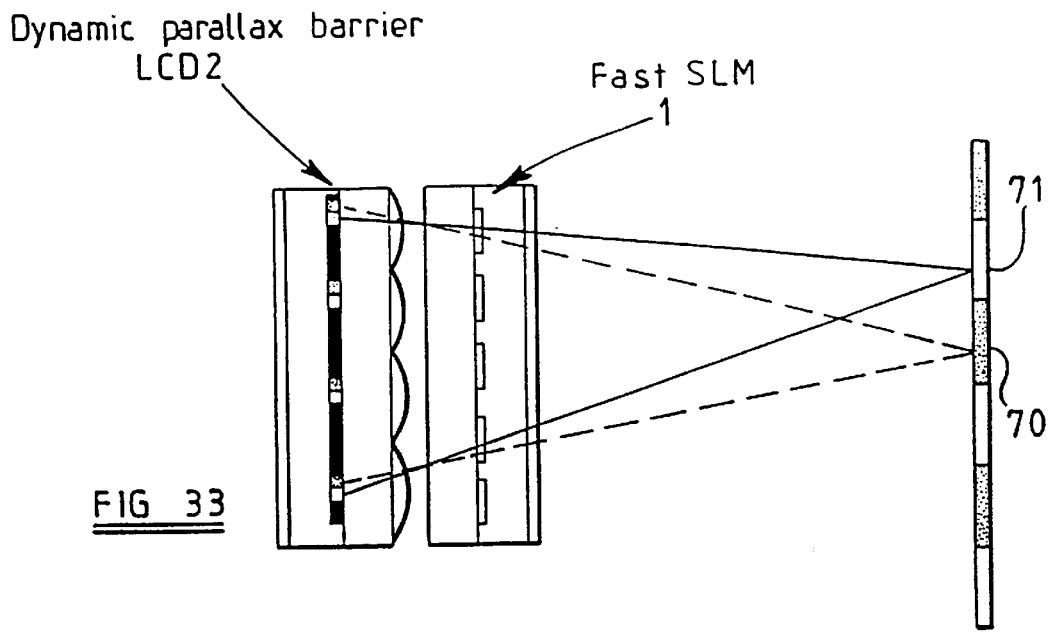
FIG 33
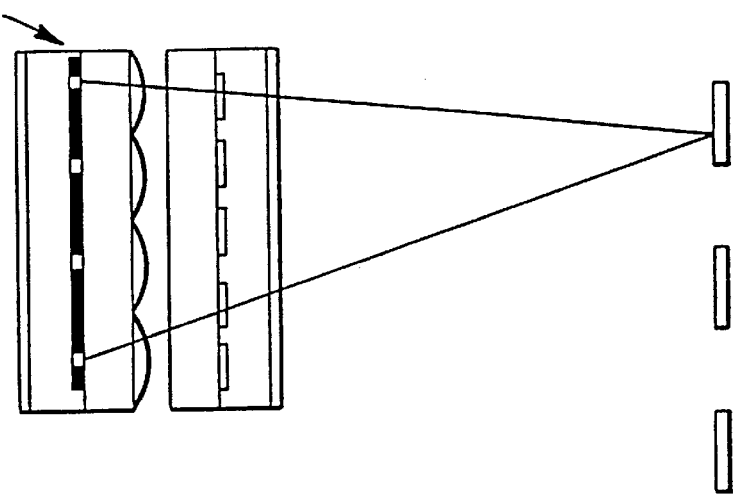
Field 1
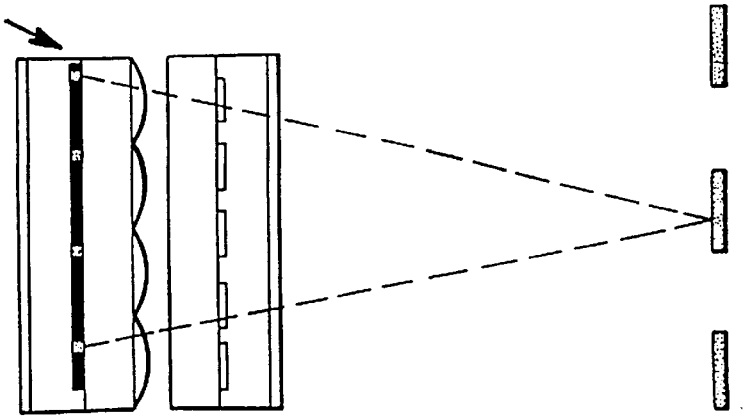
Field 2

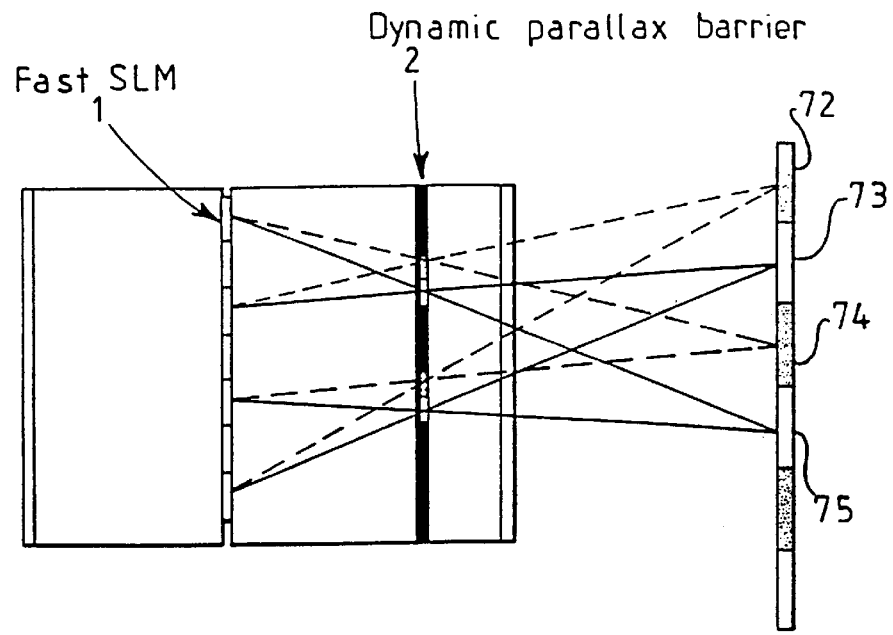
Field 1
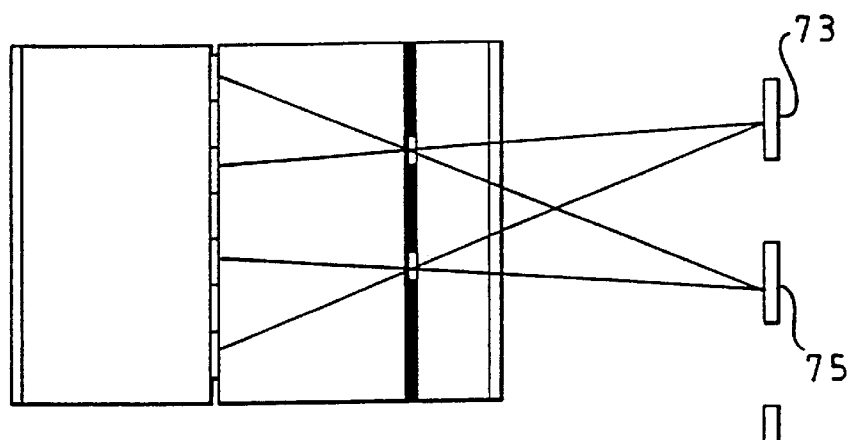
Field 2
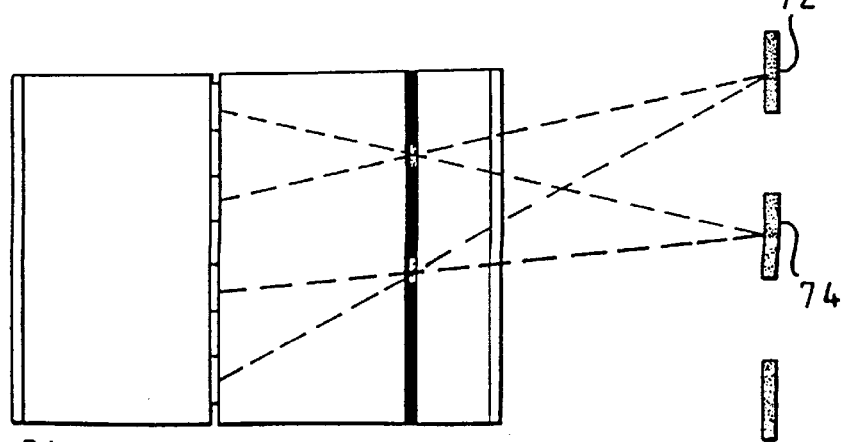
FIG 34

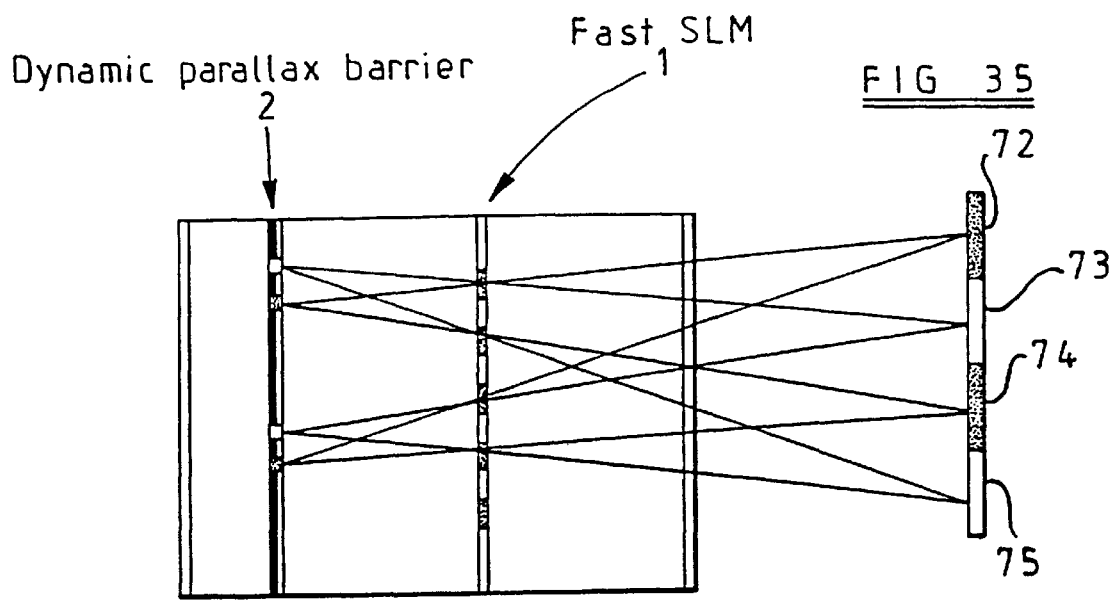
Field 1
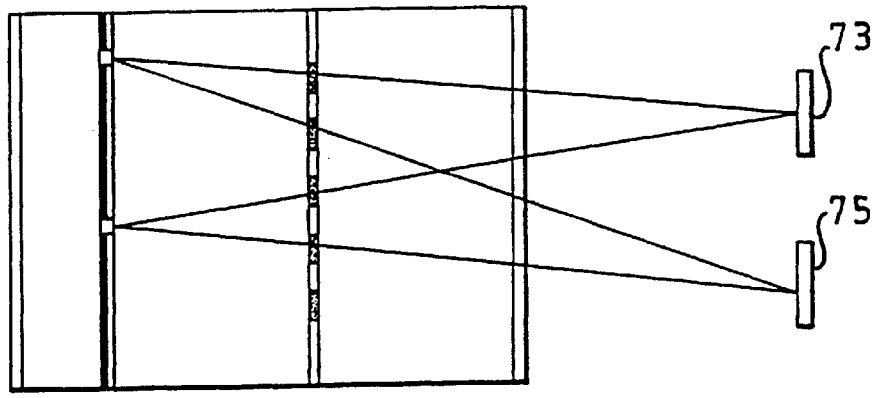
Field 2
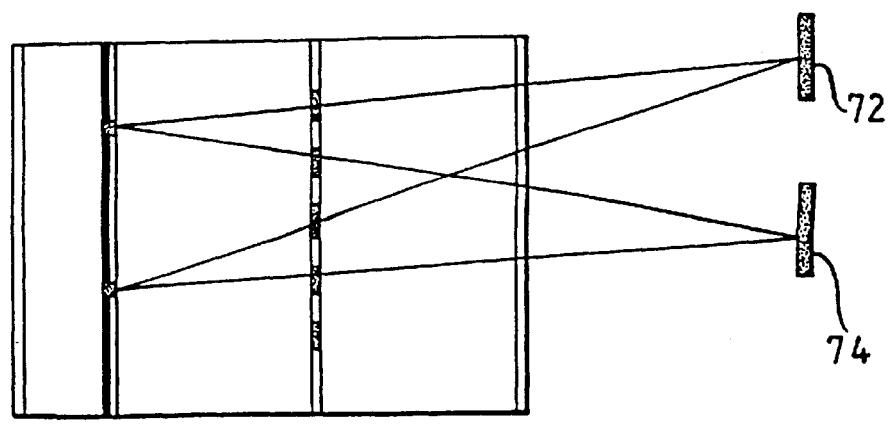
FIG 35

SPATIAL LIGHT MODULATOR, DIRECTIONAL DISPLAY AND DIRECTIONAL LIGHT SOURCE

The present invention relates to a spatial light modulator. The present invention also relates to a directional display such as an autostereoscopic display. The invention further relates to a directional light source, for instance for use in directional displays.

A known type of autostereoscopic three dimensional (3D) display is shown in FIG. 1 of the accompanying drawings. The display comprises a spatial light modulator in the form of a liquid crystal device (LCO) 1 associated with a parallax element in the form of a parallax barrier 2. The LCD 1 comprises a plurality of picture elements (pixels) arranged as a two dimensional (2D) array. The pixels are formed in a liquid crystal layer 3 and are configured as groups of columns of pixels. Each group is associated with a vertically oriented slit 4 of the parallax barrier 2. The groups of columns may comprise two or more columns and each column is arranged to display a vertical slice of a respective 2D image. The display is illuminated by a suitable backlight (not shown) in the direction of arrow 5 and the parallax barrier slits 4 produce cones of light, in the form of wedges, corresponding to the columns of each group. In viewpoint corrected displays, these light wedges overlap to define left and right viewing zones for the left and right eyes, respectively, of an observer. Thus, provided the eyes of the observer remain in the correct viewing zones, the observer can perceive a 3D image.

In order to provide greater viewing freedom for the observer, it is known to provide an observer tracking display in which the viewing zones move so as to track the observer within a permissible range of movement. In the type of display shown in FIG. 1, this may be achieved by means of a mechanical tracking system. Such a system measures the position of the observer and moves the parallax barrier 2 laterally with respect to the LCD 1 so that the eyes of the observer remain within the correct viewing zones. However, such arrangements require movement of optical components and this increases weight and power consumption of the display while reducing its ruggedness. For a display which provides two viewing zones, each eye of the observer sees a maximum of half the number of pixels of the LCD 1, both in the 3D mode and in a 2D mode of the display where both eyes see the same image information. Therefore, in the 2D mode, half of the LCD resolution is effectively wasted.

It is also possible to provide an observer tracking autostereoscopic 3D display without moving parts, for instance as disclosed in EP 0 721 131 and EP 0 726 482. However, such displays allow each eye of the observer to see only one third of the pixels of the LCD in both 3D and 2D modes of operation.

A conventional parallax barrier 2 essentially comprises an opaque plate or layer having light-transmissive slits 4 formed parallel to each other and evenly spaced. The slits extend vertically for providing lateral parallax. However, the passive parallax barrier 2 may be replaced by an active parallax barrier, for instance as disclosed in JP 03-119889. The active barrier comprises a twisted nematic (TN) LCD having vertically striped electrodes and interelectrode gaps. The electrodes define the pixels of the LCD whereas the interelectrode gaps define gaps between the pixels which remain substantially unswitched irrespective of the electric fields applied to the TN liquid crystal by the electrodes. The pitches of the barrier and display SLMs are substantially equal.

The LCD may be configured to provide normally white or normally black operation. FIG. 2 illustrates the magnified appearance of a small part of an LCD operated in the normally white modes in particular, the LCD is arranged to act as a parallax barrier in that the vertically extending pixel 6 is controlled to be transparent so as to constitute a slit of the barrier whereas the pixels between the transmissive slits, such as 8, are controlled to be opaque. However, the unswitched regions 9 remain partially or wholly transmissive. This prevents good contrast being achieved in what should be the opaque regions of the barrier and can result in crosstalk leading to undesirable visible artefacts in the 3D image seen by the observer. In order to display a 2D image, the whole of the parallax barrier 2 can be made substantially uniformly transmissive so that all of the pixels of the LCD are visible to both eyes of the observer and the full spatial resolution of the LCD can be used in such a 2D mode. In this mode, the parallax barrier is effectively "switched out" unlike in the 2D mode of displays having non-switchable parallax barriers.

FIG. 3 illustrates the appearance of the active barrier 2 when configured to operate in the normally black mode. Operation in either the normally black mode or the normally white mode is fixed at the time of manufacture. Again, the pixel 6 is controlled to be transmissive so as to form a slit and the slits are separated by opaque regions. However, the vertical gap 10 between the pixels 6 and 7 cannot be controlled to be transmissive and may cause undesirable visible artefacts. As is well known, the normally black mode does not permit good extinction of polarised light in the black or opaque areas and provides a poorer viewing angle. Poor extinction results in image leakage through the black areas which increases crosstalk in the 3D display mode of operation. In the full resolution 2D mode where all the slits are switched clear, the unswitched interelectrode regions remain substantially opaque so that display contrast is reduced. However, a more serious problem is that Moire patterns are produced in the 2D mode because of beating between the residual pattern of the unswitched interelectrode columns of the active barrier 2 and the underlying structure of the LCD 1. Further, there is increased diffraction from the barrier 2.

A known display disclosed in a Sanyo press release entitled "2D/3D Switchable Display" issued on May 10, 1996 discloses a display which can be switched between 2D and 3D modes in each of sixteen fixed zones. This is achieved by the use of a passive rear parallax barrier and an overlaid 4×4 segment electrically switchable diffuser in the form of a polymer dispersed liquid crystal.

A projection display in which the interelectrode gaps throughout the display are switched black ahead of operating time is disclosed in McDonnell 93. This is done to avoid using a separate black matrix layer.

EP 0 540 137 discloses a 3D image display which has an electrically generated parallax barrier formed in an LCD. However, there is no substantial disclosure of the structure or operation of such a parallax barrier. In particular, there is no disclosure in relation to controlling the liquid crystal in the gaps betwen electrodes U.S. Pat. No. 5,122,888 discloses a camera focusing plate containing a liquid crystal. A phased diffraction grating can be established in the liquid crystal by applying an electric field so as to rotate the molecules of the liquid crystal and change the refractive index to light passing through the liquid crystal in order to produce a diffuser. There is disclosure of refractive index change at the gaps between electrodes by a leakage electric field but the resulting refractive index change is less than that which occurs in the liquid crystal at the electrodes and a sinewave refractive index profile is created.

EP 0 586 098 discloses a light modulating apparatus for use in reconstruction of a one-dimensional hologram. The apparatus contains a number of pixels which have a small width in the horizontal direction but which are relatively tall. Driving elements for the pixels are provided at the ends of the pixels and are not placed between adjacent pixels. The apparatus is said to have a good resolution in the horizontal direction. However, there is no disclosure relating to switching of a display medium at gaps between electrodes.

According to a first aspect of the invention, there is provided a spatial light modulator characterised by a modulator region which is switchable between a clear mode, in which the region is of substantially uniform transmissivity, and a barrier mode, in which the region has a plurality of evenly spaced parallel transmissive strips extending in a first direction and separated by continuous substantially opaque sub-regions.

The region may comprise a plurality of picture elements extending in the first direction. The picture elements may be switchable together to opaque to define the sub-regions and may be spaced apart to define the transmissive slits. The picture elements may define gaps therebetween, which gaps are switchable between transmissive and opaque independently of the picture elements.

The region may comprise a two-dimensional array of picture elements, each of which is independently switchable between transmissive and opaque and which define gaps therebetween, which gaps are switchable between transmissive and opaque. The gaps may be independently switchable between transmissive and opaque.

The modulator may comprise a liquid crystal device including a first layer of liquid crystal material. The first layer may comprise ferroelectric liquid crystal material, anti-ferroelectric liquid crystal material or super-twisted nematic liquid crystal material. The first layer may include an anisotropic dye.

The picture elements may be defined by addressing electrodes. The addressing electrodes may comprise a passive matrix addressing arrangement. The gaps may be switchable by means of fringing fields.

The opaque sub-regions may be reflective.

According to a second aspect of the invention, there is provided a spatial light modulator characterised by a modulator region which is switchable between a first mode, in which the region is arranged to supply light of a substantially uniform first polarisation, and a second mode, in which the region is arranged to supply light of the first polarisation in a plurality of evenly spaced parallel strips and to supply light of a second polarisation, different from the first polarisation, in continuous sub-regions which separate the strips.

The second polarisation may be orthogonal to the first polarisation.

According to a third aspect of the invention, there is provided a directional display characterised by a modulator in accordance with the first or second aspect of the invention co-operating with an image display.

The image display may comprise a further spatial light modulator. The further spatial light modulator may comprise a further liquid crystal device including a second layer of liquid crystal material. The display may comprise first and second substrates with the first layer therebetween and a third substrate with the second layer between the second and third substrates. The display may comprise a single polariser between the first and second layers.

According to a fourth aspect of the invention, there is proivided a directional light source characterised by a modulator according to the first or second aspect of the invention co-operating with a diffuse light source.

The light source may comprise a lenticular sheet having lenticules extending in the first direction.

It is thus possible to provide an SLM which is suitable for use in autostereoscopic and stereoscopic 3D displays. For instance, in an autostereoscopic display, the SLM may be operated in the barrier mode to define a parallax barrier having good contrast performance and providing low levels of crosstalk. In the clear mode, substantially uniform transmissivity is provided so that the full resolution of an associated image display may be used while Moire effects with the display structure are substantially reduced or eliminated. In some embodiments, different areas of the SLM may be operated simultaneously in the clear and barrier modes so that one or more pans of a directional display displays a 3D image and one or more other parts display a 2D image. Also, in some embodiments, the barrier mode is such that the positions of the transmissive slits can be electronically varied perpendicularly to the first direction. Such an arrangement permits observer tracking with no moving parts in an autostereoscopic 3D display. For such an application, the SLM may be disposed adjacent the image display so as to control the positions of viewing zones. In an alternative arrangement, the SLM may be associated with a backlight to provide a directional light source emitting light in light beams or "wedges" whose direction can be controlled electronically.

The SLM does not have a black mask so that the manufacturing process is simplified. Full brightness is achieved in parts of the SLM which are controlled to be transmissive or "white" and the whole of the modulator clear or "white" without leaving residual black mask areas which would generate Moire patterns by beating with the similar pixel structure of an image display.

It is possible to make use of "bistable" liquid crystal materials such as ferroelectric liquid crystals (FLC), anti-ferroelectric liquid crystals (AFLC) with a sharply defined electro-optic transition, and super-twisted nematic (STN) liquid crystals. This permits the use of passive matrix addressing so that there are no interelectrode opaque regions as in the case of active matrix addressing where electronic devices such as thin film transistors have to be located in the gaps between opaque addressing electrodes. Power consumption is also reduced so that the SLM is suitable for use in battery powered displays such as lap top personal computers (PC) and personal digital assistants (PDA). Such an SLM therefore has advantages of improved aperture and hence brightness, simplicity and reduced cost compared with twisted nematic (TN) techniques using thin film transistors, for instance as disclosed in JP 0 3-119889, in addition to other advantages mentioned hereinbefore.

The invention will be further described, by way of example, with reference to the accompanying drawings, in which:

FIG. 2 illustrates the appearance of a representative subregion of an SLM operating in the normally white mode to provide an electronic parallax barrier;

FIG. 3 illustrates the appearance of an SLM operating in the normally black mode to provide an electronic parallax barrier;

FIG. 9 illustrates in more detail the structure of the display shown in FIG. 8;

FIG. 10 is a view similar to FIG. 9 showing an alternative position of an internal polariser;

FIG. 11 is a view similar to FIG. 9 in which an internal polariser is replaced by dye in a guest-host arrangement;

FIG. 12 illustrates a suitable orientation of the rubbing direction of the FLC barrier SLM with respect to the display SLM;

FIG. 13 illustrates a preferred tilt angle for a dyed FLC;

FIG. 14 illustrates a standard tilt angle for a dyed FLC;

FIG. 15 shows the display of FIG. 10 with a black mask in an alternative position;

FIG. 16 shows the structure of a 3D display using a directional backlight constituting an embodiment of the invention;

Figure 8:
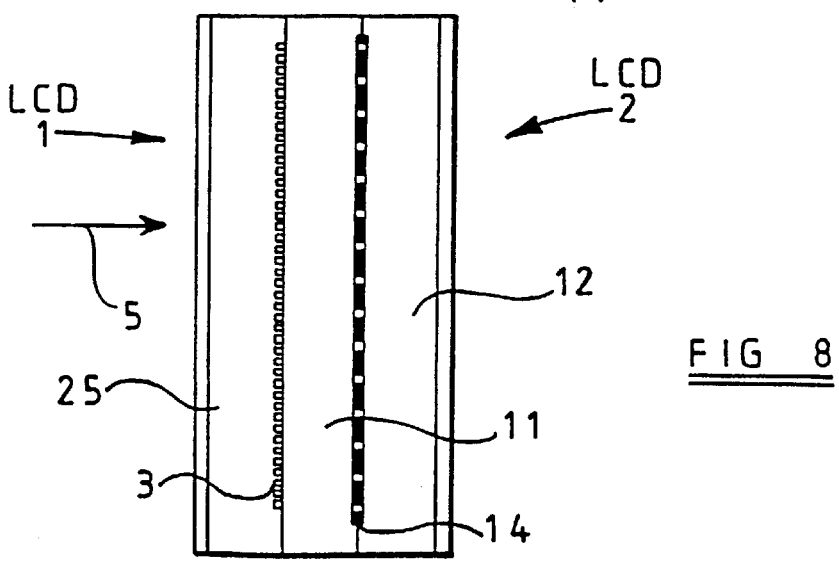
FIG. 8 shows a horizontal cross section of a 3D display constituting an embodiment of the invention.
Figure 5:
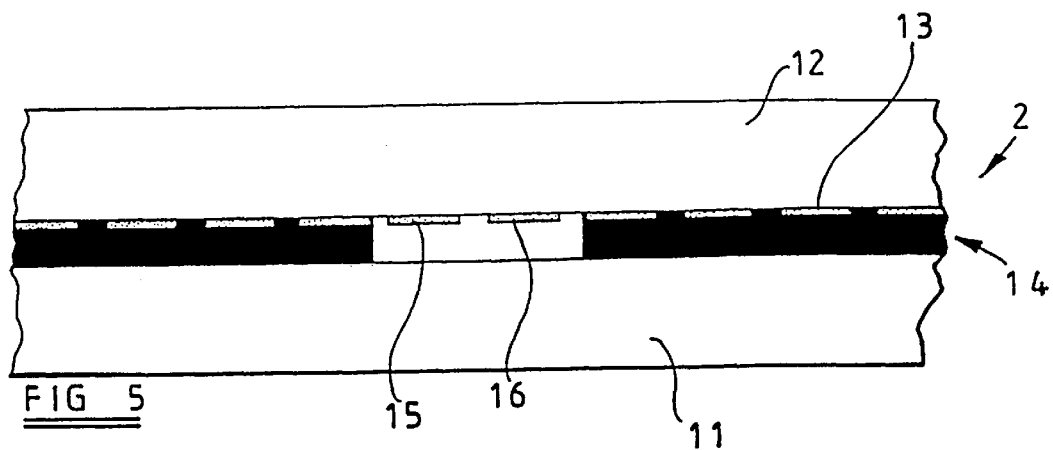
FIG. 5 shows a horizontal cross section of an SLM constituting an embodiment of the invention.
Figure 30:
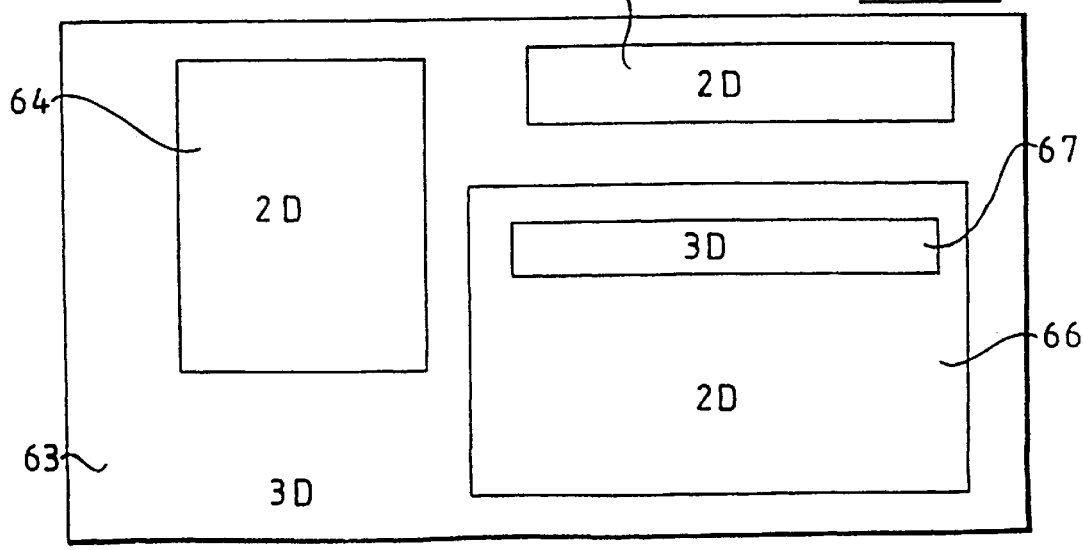
Figure 18:
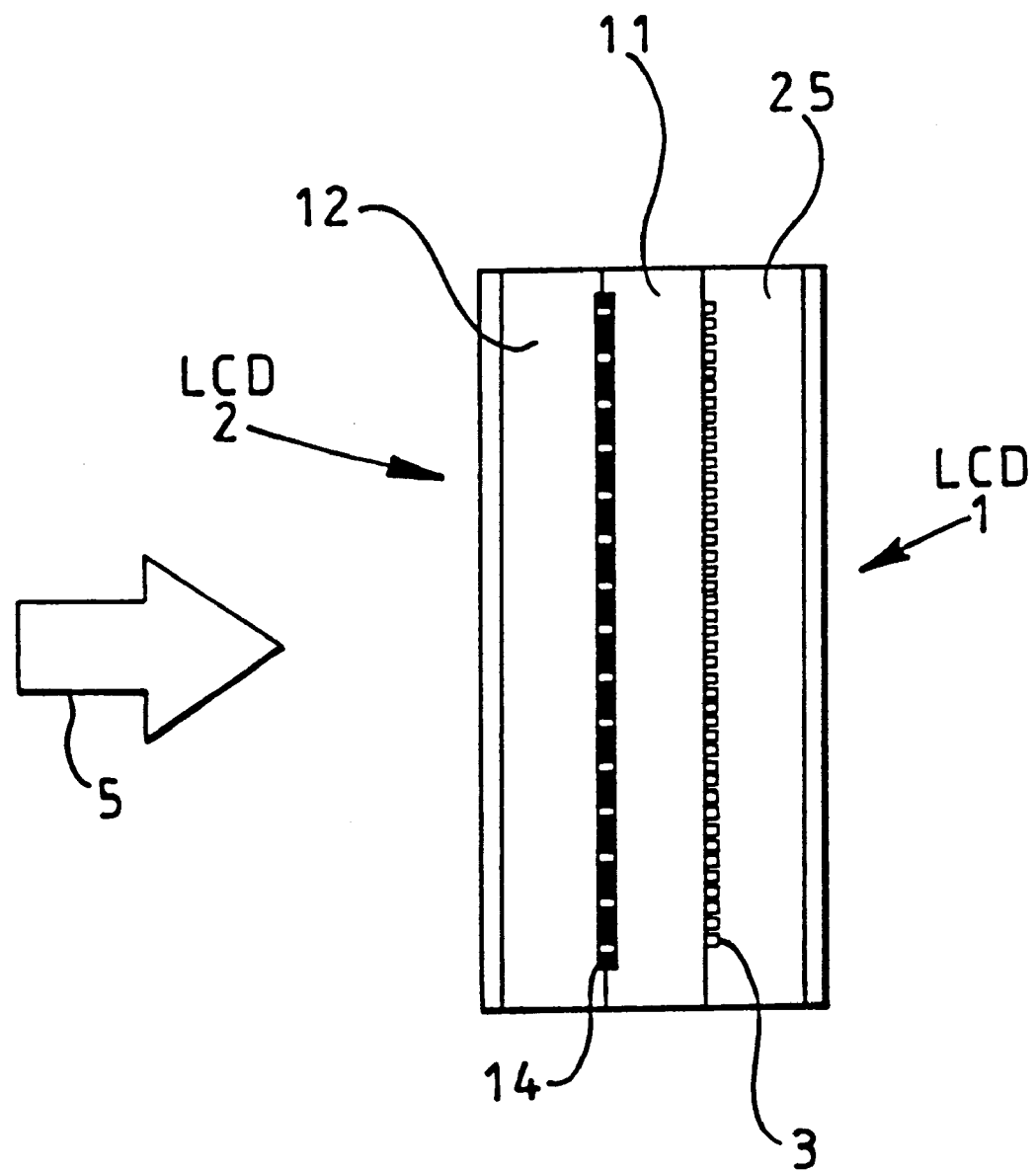
Figure 23:
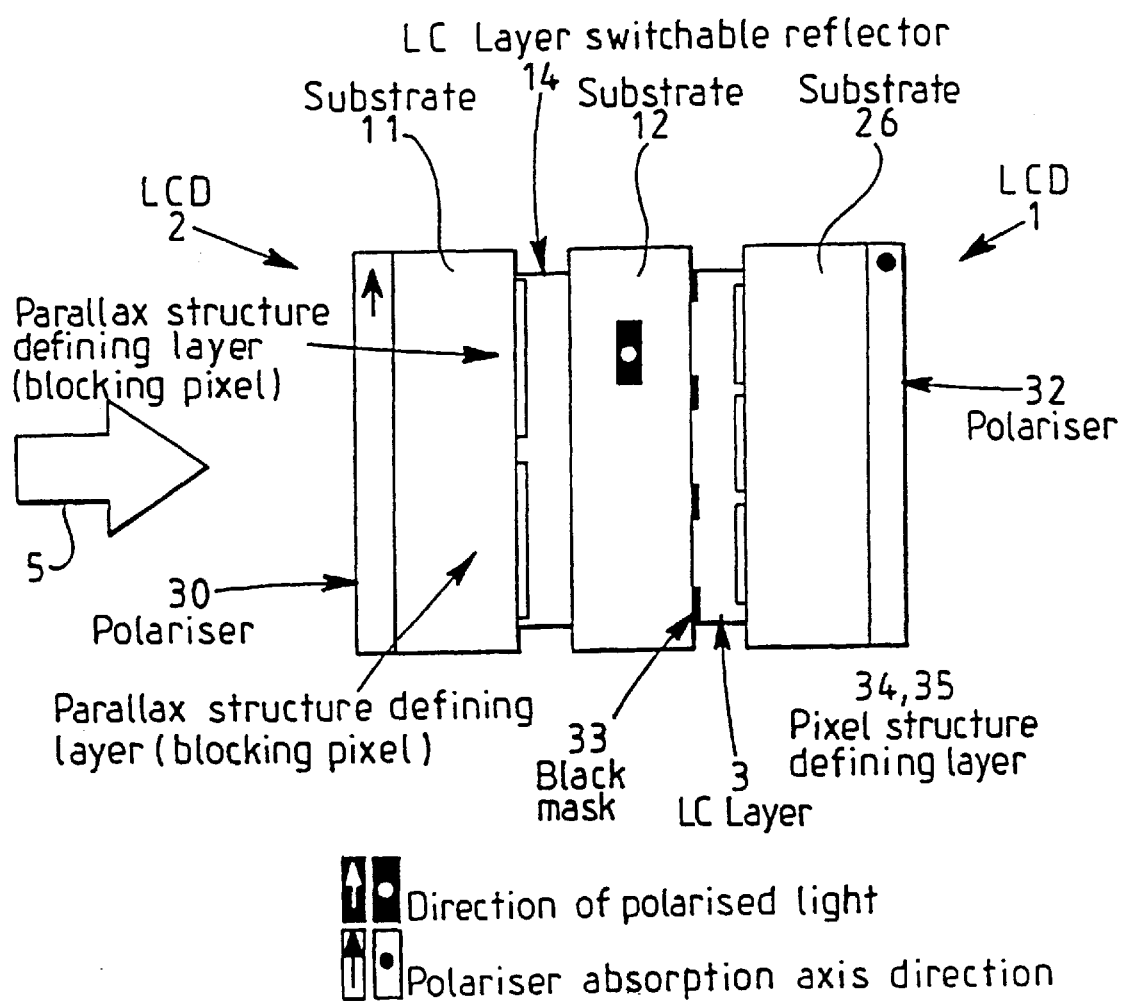
Figure 27A:
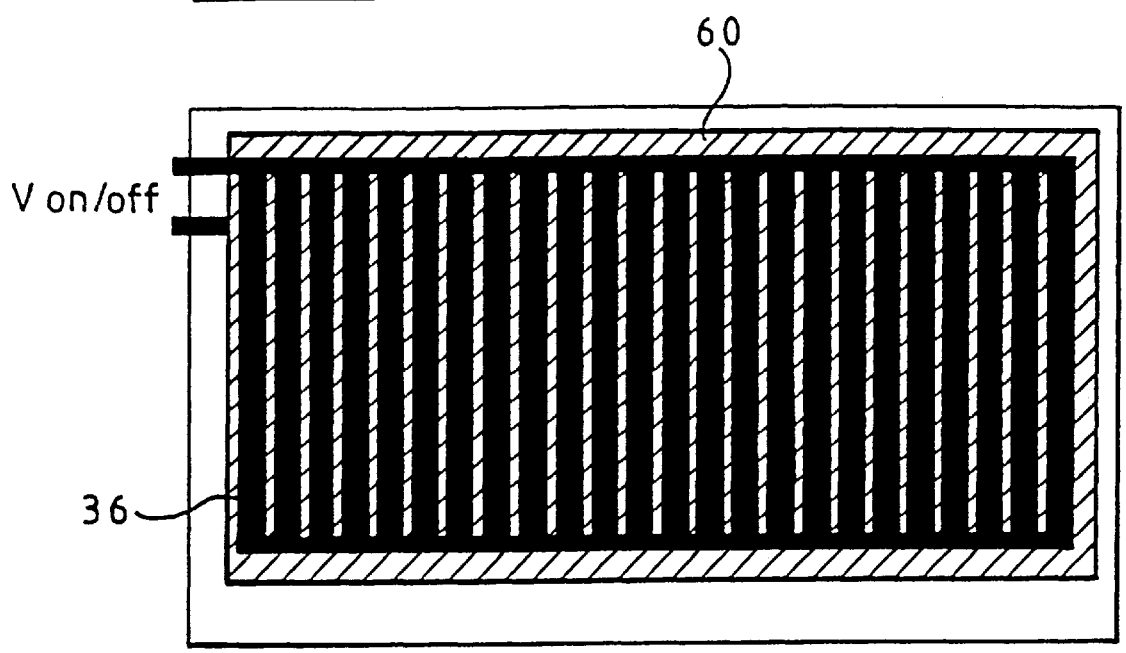
Figure 28:
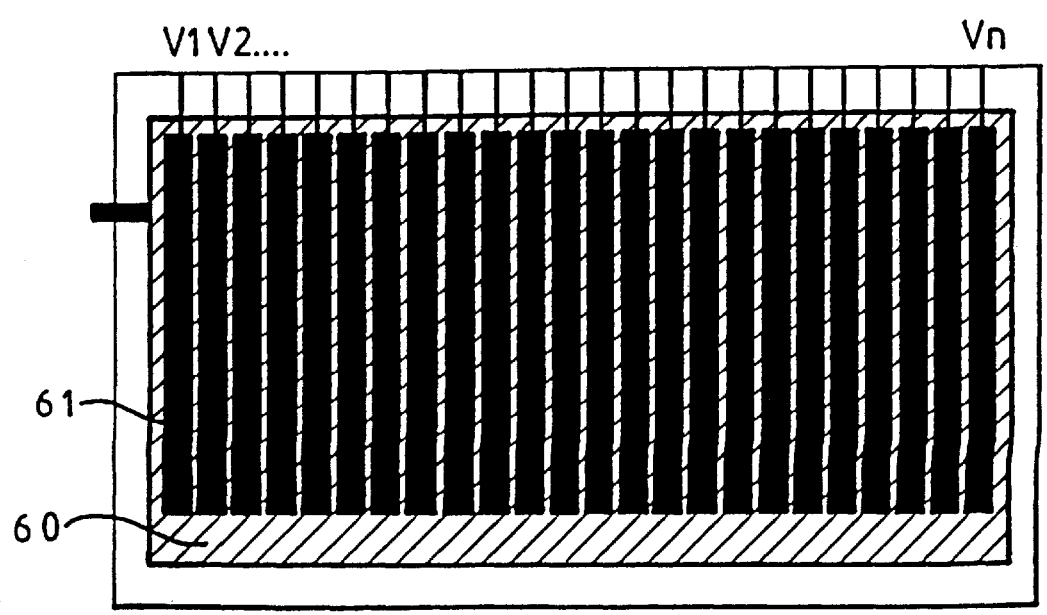
Figure 27B:
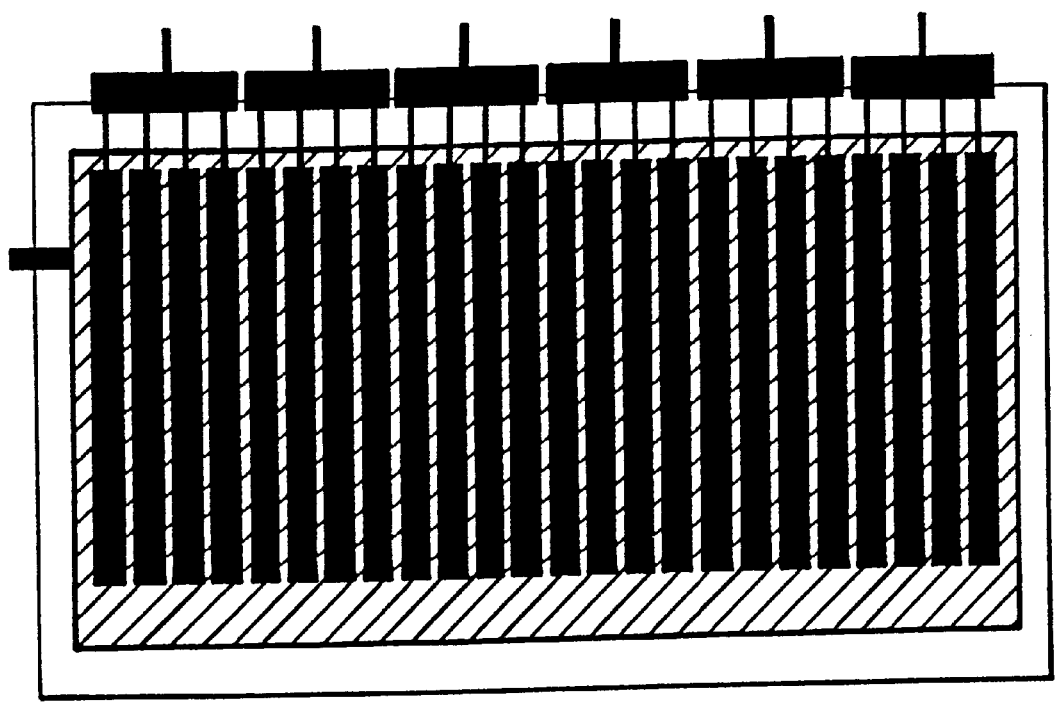
Figure 29:
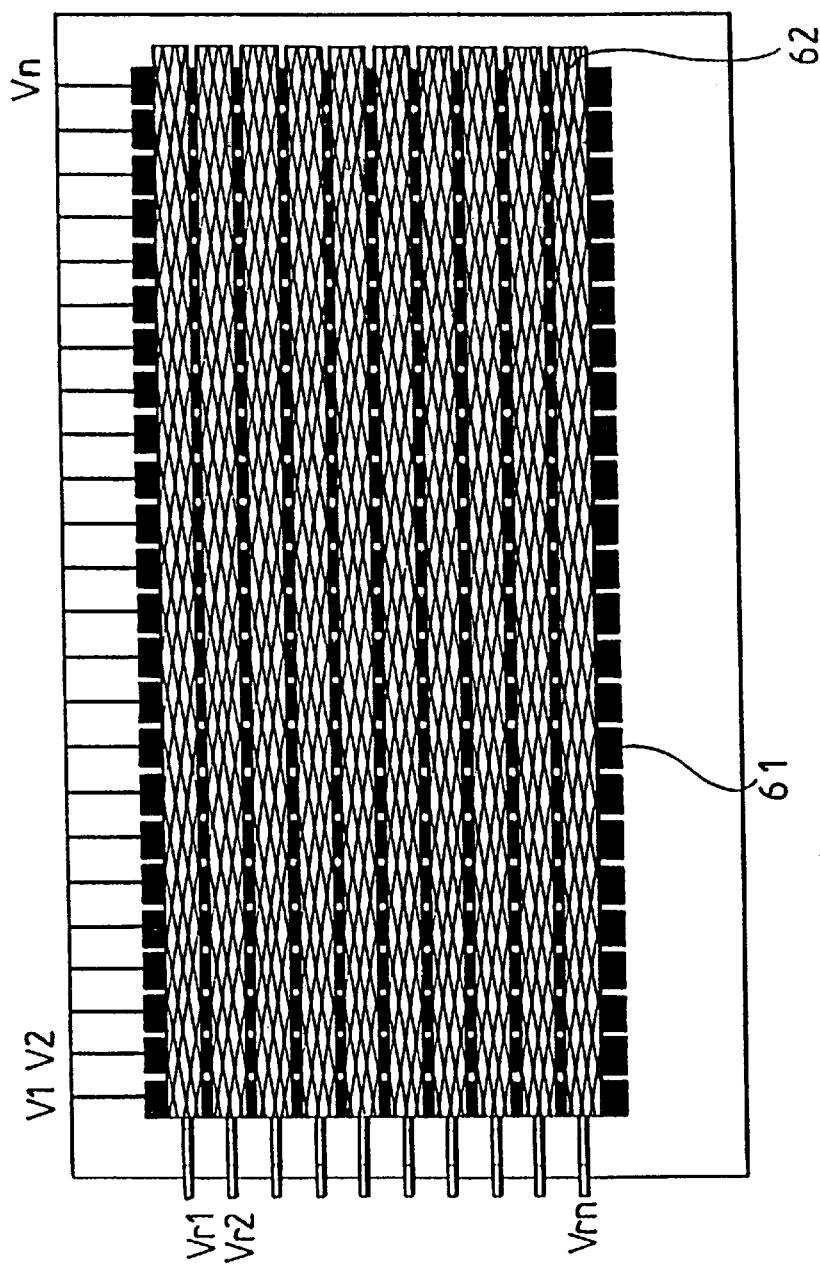
Figure 36:
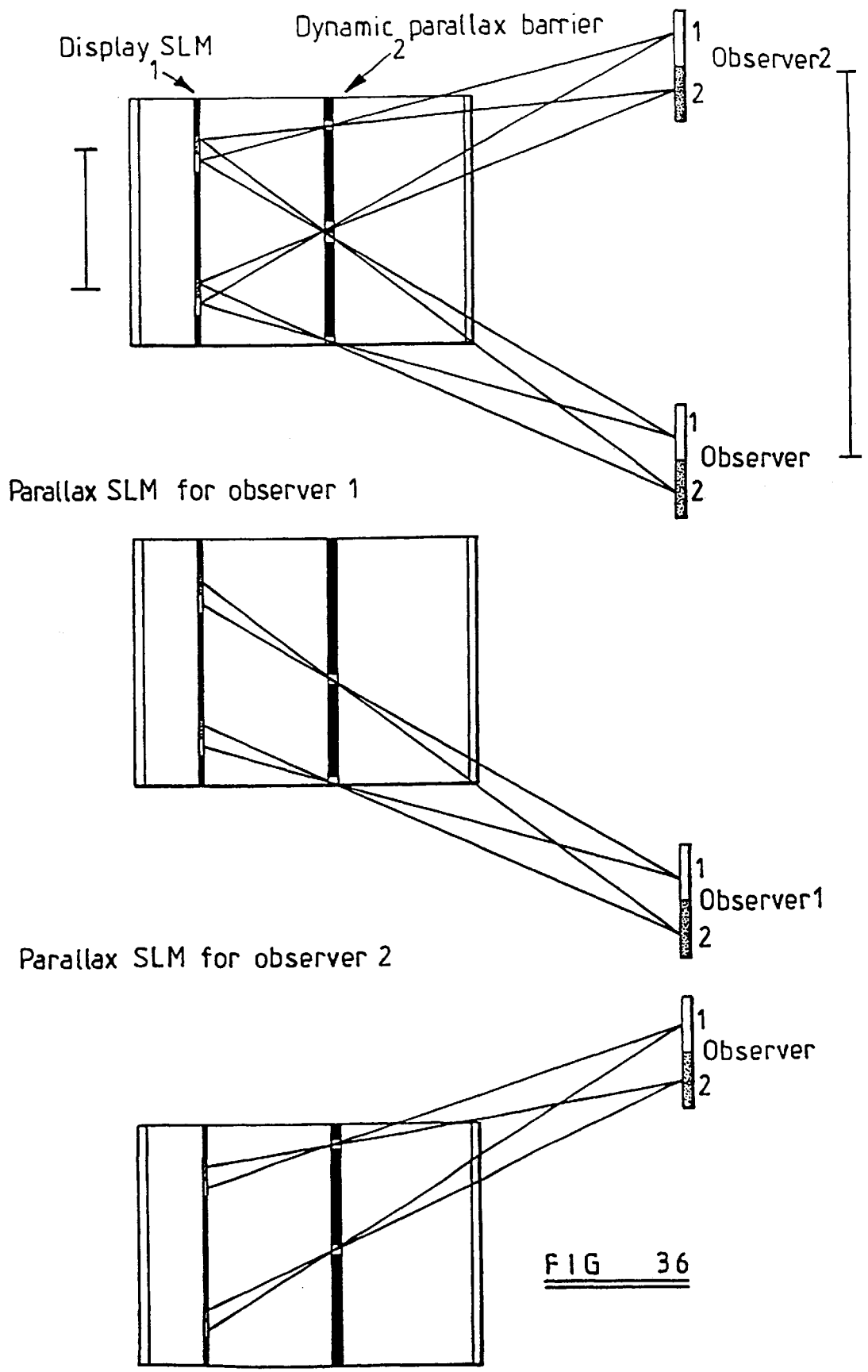
Figure 37:
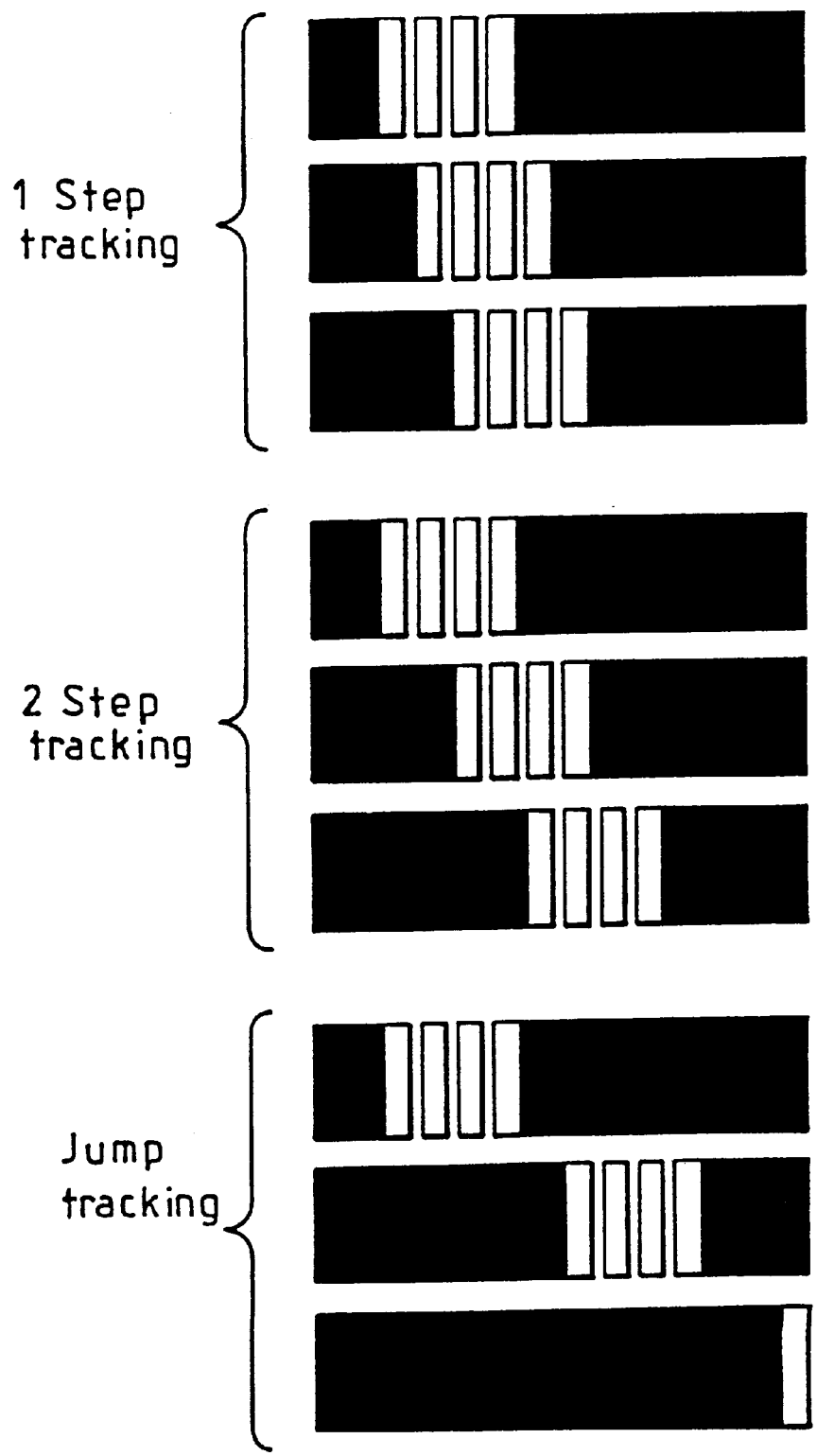
Figure 38:
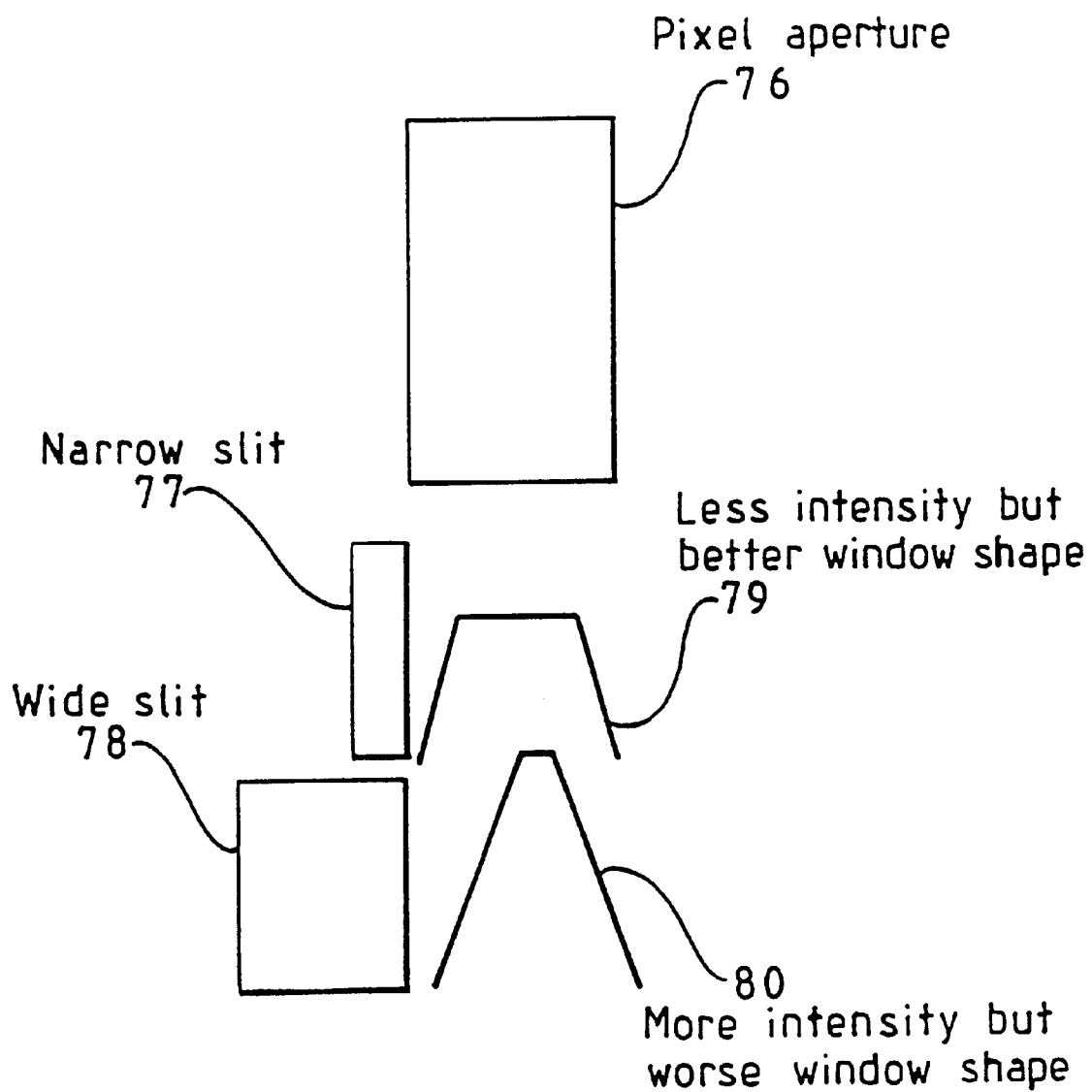

FIGS. 17 to 22 correspond to FIGS. 4, 8 to 11 and 15, respectively, but show alternative configurations of 3D displays having rear parallax barriers;

FIG. 23 shows the structure of a 3D display having a rear reflective parallax barrier;

FIGS. 24 to 26 illustrate alternative arrangements of reflective parallax barriers in an SLM;

FIG. 27a illustrates an electrode pattern for an SLM which is switchable between a barrier state providing fixed transmissive slits and a clear state;

FIG. 27b illustrates an electrode pattern for an SLM which is switchable in regions;

FIG. 28 illustrates an electrode pattern for an SLM which, in its barrier mode, provides slits whose positions are controllable so as to permit observer tracking in a 3D display;

FIG. 29 illustrates an electrode pattern for an SLM permitting observer tracking and dynamically configurable 2D and 3D zones in a 3D display;

FIG. 30 illustrates a possible configuration of 2D and 3D zones on a display having the electrode pattern of FIG. 29;

FIGS. 31 and 32 illustrate two arrangements of temporally multiplexed 3D displays using an SLM of the type illustrated in FIGS. 8 and 18;

FIG. 33 illustrates use of an SLM of the type shown in FIG. 5 to provide a steerable backlight in a temporally multiplexed 3D display;

FIG. 34 illustrates use of an SLM of the type shown in FIG. 5 in a 3D display having spatial and temporal multiplexing;

FIG. 35 illustrates a display similar to FIG. 34 but with a rear parallax barrier;

FIG. 36 illustrates operation of a display of the type shown in FIG. 8 for simultaneously tracking two observers;

FIG. 37 illustrates the appearance of an SLM of the type shown in FIG. 5 for different observer tracking modes; and FIG. 38 is a diagram illustrating the effect of slit width on window quality or crosstalk and brightness.

Like reference numerals refer to like parts throughout the drawings.

Figure 1:
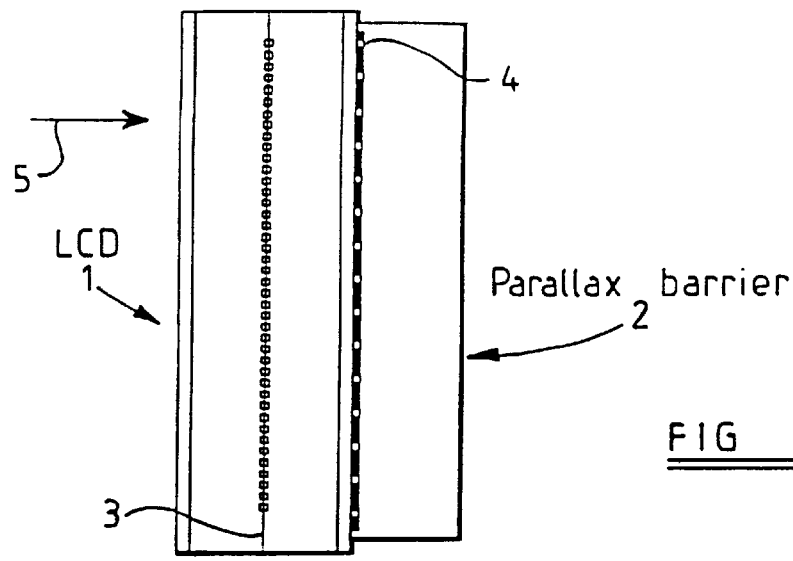
FIG. 1 shows a horizontal cross section of a known type of autostereoscopic 3D display.
Figure 4:
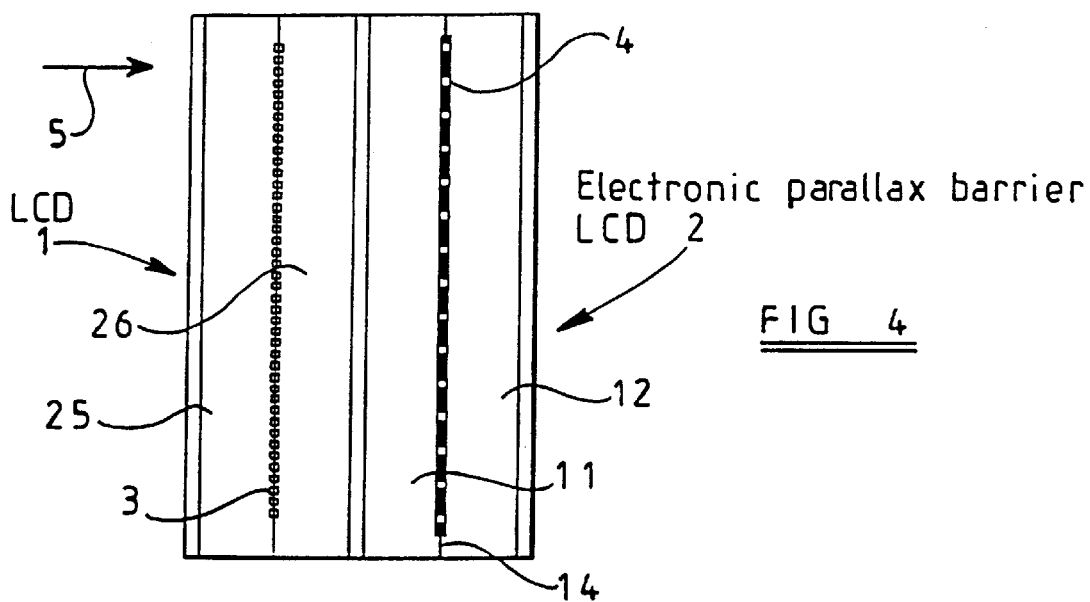
FIG. 4 shows a horizontal cross-section of part of an autostereoscopic 3D display constituting an embodiment of the invention.

FIG. 4 illustrates an autostereoscopic 3D display of the front parallax barrier type comprising an LCD 1 and an electronic parallax barrier in the form of an LCD 2. The LCD 1 may be of the same type as shown in FIG. 1 and comprises a liquid crystal layer 3 which provide a 2D array of pixels for modulating light incident from a light source (not shown) in the direction 5 with spatially multiplexed 2D images recorded from different viewpoints.

The LCD 2 is arranged and controlled so as to act as a parallax barrier providing the transmissive strips or slits such as 4. Each slit 4 is aligned with a group of columns of pixels with each column of the group displaying a vertically extending strip of a respective 2D image. As described hereinafter, the LCD 2 has a barrier electrode pitch which is at least twice the pixel pitch of the LCD 1.

The structure of the LCD 2 is shown in more detail in FIG. 5. The LCD 2 comprises a substrate 11 carrying an electrode arrangement and alignment layer (not shown) and a substrate 12 which carries column electrodes 13 and an alignment layer (not shown). A liquid crystal layer 14 is disposed between the substrates 11 and 12 and comprises FLC, AFLC; or STN liquid crystal as appropriate. In particular, the liquid crystal layer 14 comprises sharp threshold liquid crystal material and is addressed by a passive matrix electrode arrangement including the column electrodes 13. The electrodes are transparent and may be made of indium tin oxide (ITO). There is no black mask.

Figure 6:
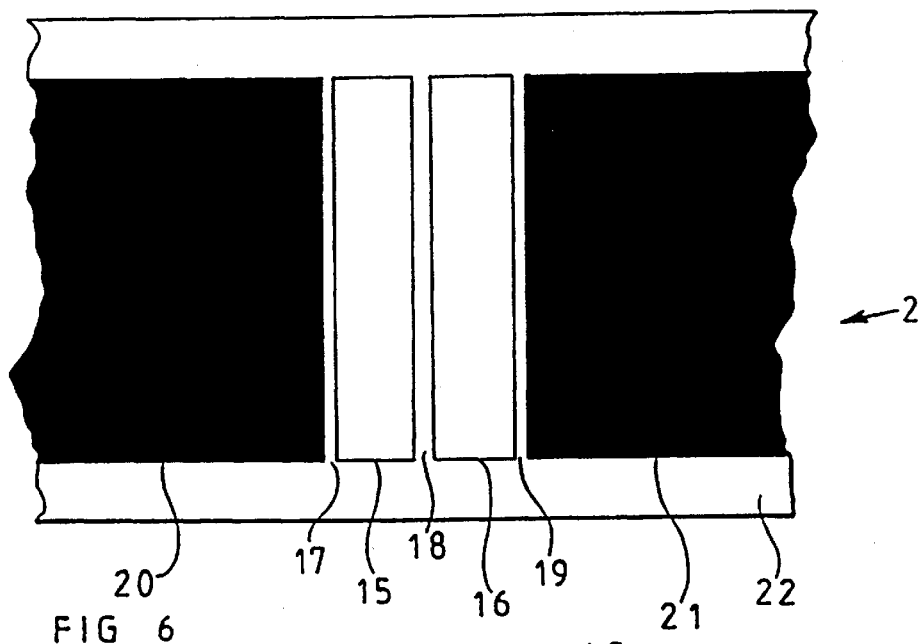
FIG. 6 illustrates the appearance of the SLM of FIG. 5 around one aperture during operation.

FIG. 6 illustrates the appearance of a small part of the LCD 2 during operation. The LCD 2 has orthogonally oriented input and output polarisers (not shown in FIG. 5). In a barrier mode of operation, column electrodes 15 and 16 apply electric fields to the vertically oriented elongate pixels so as to switch the pixels to their clear or transmissive state. The column electrodes 15 and 16 are substantially transparent but their outlines are shown in FIG. 6 for the purpose of illustration. Further, fringing fields or suitable electrical pulses are applied to the electrodes so that the interelectrode gaps 17, 18 and 19 are also switched to the transmissive state. A vertically extending transmissive slit is therefore formed and evenly spaced parallel slits are thus provided by suitably controlling the LCD 2 so as to form an electronic parallax barrier which in combination with the LCD 1 forms an autostereoscopic display.

In the regions such as 20 and 21, the electrodes cause the pixels and the gaps between the pixels within the liquid crystal layer 14 to be switched to the opaque state. The edge portions 22 may also be switched to the opaque state so that the LCD 1 acts as a parallax barrier comprising a plurality of parallel evenly spaced continuously transparent slits separated by continuously opaque regions such as 20 and 21.

In the clear mode of operation, the electrode arrangement including the electrodes 13, 15 and 16 supplies fields such that the whole of the liquid crystal layer 14 is switched to the clear or transmissive state. The LCD 2 is thus continuously and substantially uniformly transmissive throughout its modulating region. In this clear mode of the LCD 2, the display operates as a full resolution 2D display.

The LCD 2 provides good viewing angle performance and good contrast performance without any of the visual artefacts illustrated in FIGS. 2 and 3. Thus, when used in the autostereoscopic 3D display shown in FIG. 4, low levels of crosstalk are achieved in the 3D mode. In the 2D mode, visual artefacts such as Moire beating with the pixel structure of the LCD 1 are greatly reduced or eliminated compared with arrangements incorporating black masks, unswitched gaps between electrodes or opaque addressing electrodes within the parallax barrier LCD.

Figure 7A:
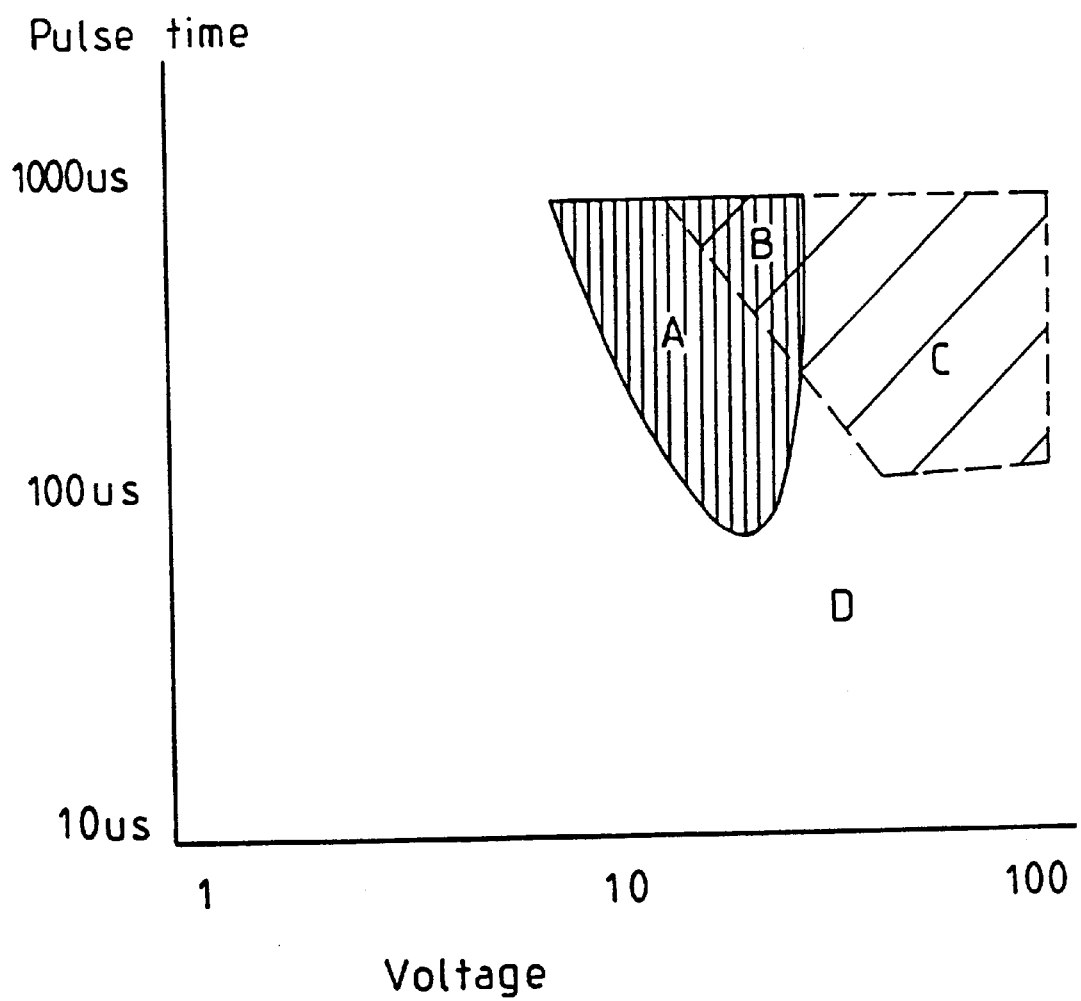
FIG. 7a is a graph of pulse length in microseconds against pulse amplitude in volts showing τ-V curves for pixel and interpixel liquid crystal regions.
Figure 7B:
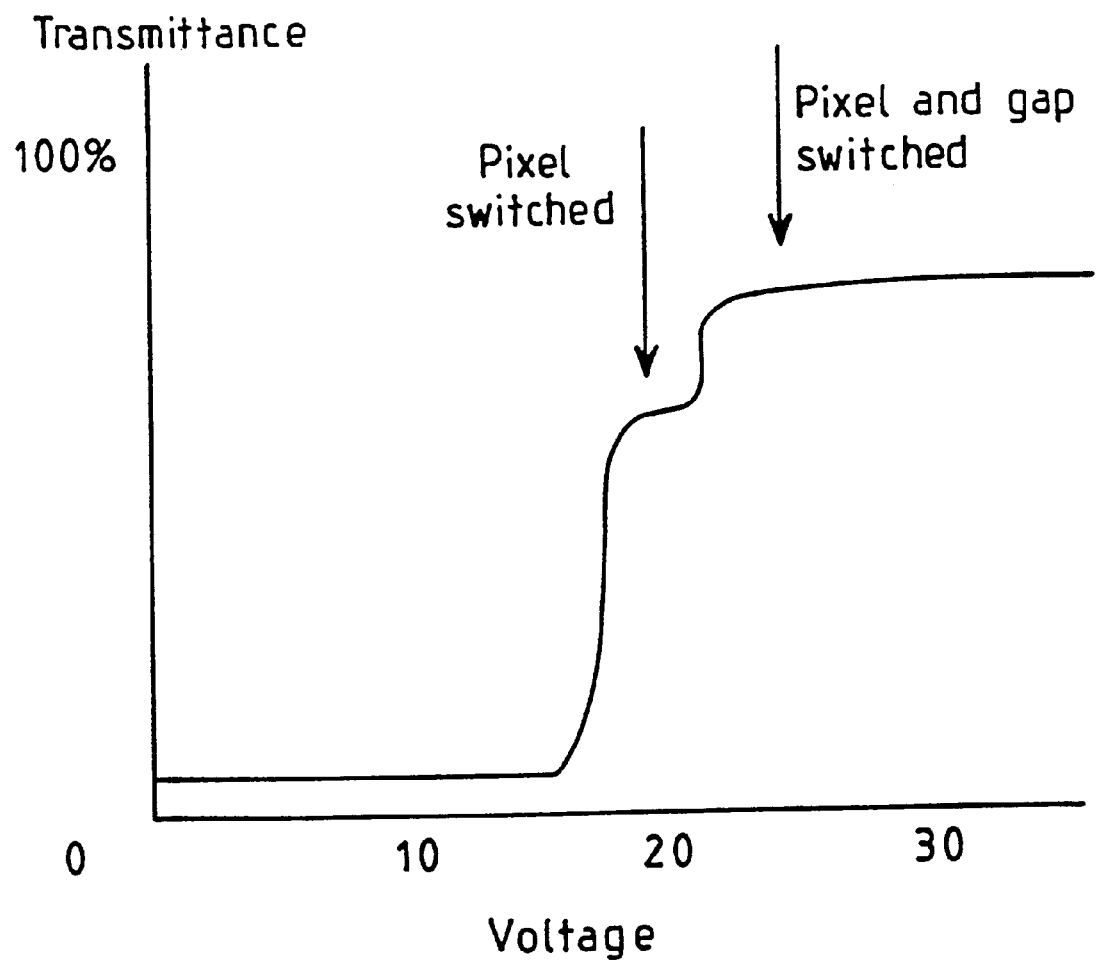
FIG. 7b is a graph of transmittance against voltage illustrating pixel and interpixel switching.

The parts of the liquid crystal layer 14 in the gaps between the electrodes such as 13 have their own switching characteristics as illustrated in FIG. 7a, which is τ-V graph for pulses applied to the addressing electrodes. The region of the τ-V plane indicated by A is the switching region for the pixel whereas a region C is the switching region for an adjacent interelectrode gap. Both the pixel and the interelectrode gap are switched in the region B whereas neither is switched in the region D.

The curves shown in FIG. 7a relate to an arrangement having a 4 micrometer interelectrode or interpixel gap with 50 micrometer pixels.

In the case of 2D matrix electronic parallax barriers, both horizontal and vertical gaps exist. The switching characteristics of the horizontal and vertical gaps can be different if they have a different orientation with respect to the rubbing or alignment direction of the liquid crystal. Thus, the horizontal and vertical gaps and the pixel can be controlled as required.

The gaps may be switched to be entirely opaque or clear in a separate addressing phase. Alternatively, appropriate data and strobe voltages may be applied to the same electrodes at different times in order to control the switching of the gap and the pixel independently. The width of the interpixel gaps may also be controlled so as to be appropriate for allowing switching by fringing fields of adjacent electrodes. For this purpose, the interpixel gap is preferably between 0.1 and 30 micrometers, and more preferably between 1 and 5 micrometers. The addressing signals are arranged such that both the pixels and the interelectrode gaps are switched in a binary fashion. Thus, no black mask is required to achieve high contrast and low cross talk. In the full resolution 2D mode, the liquid crystal layer 14 is controlled so that light is transmitted through all parts of the LCD 2. Thus, there is no or substantially no generation of Moire patterns.

The LCD 1 shown in FIG. 4 comprises substrates 25 and 26 in addition to the pixellated liquid crystal layer 3. The substrates 11, 12, 25 and 26 typically comprise glass of thickness 0.7 millimeters in addition, at least one polariser typically of 0.2 millimeters thickness is disposed between the liquid crystal layers 3 and 14. For a high resolution display panel, for instance of the XGA type having 1024× 768 colour pixels, the pitch of the pixels in the layer 3 is typically 80 micrometers. As described hereinbefore, the 3D display produces viewing zones for the eyes of the observer and the widest parts of these viewing zones are disposed in a plane parallel to the display and are referred to as viewing windows. Typically, viewing windows of the order of 65 millimeters corresponding to the typical interocular distance are provided in the plane which is the nominal or best viewing distance for the display. This gives rise to a viewing distance of the order of 850 millimeters. This is relatively large for displays, for instance, of less than 12 inch diagonal size.

In this example, the pitch of the electrodes in the LCD 2 is preferably less than 40 micrometers and more preferably less than 11 micrometers.

FIG. 8 illustrates a display of the type shown in FIG. 4 but in which one of the middle substrates such as 26 has been eliminated. The display is formed as a single device with the substrate 11 being common to the LCDs 1 and 2. The consequent reduction in thickness between the layers 3 and 14 results in a nominal viewing distance of the order of 350 millimeters, which is more acceptable particularly for displays whose diagonal size is less than 12 inches.

FIG. 9 shows the structure of the display of FIG. 8 in more detail. The display comprises an input polariser 30 for the LCD 1, an internal polariser 31 which acts as an output polariser for the LCD 1 and an input polariser for the LCD 2, and an output polariser 32 for the LCD 2. The polarisation absorbing directions of the polarisers are indicated by a dot for a direction normal to the plane of FIG. 9 and by an arrow for a direction parallel to the plane of FIG. 9.

The LCD 1 further comprises a black mask 33 which covers, for instance, semiconductor structures forming part of the LCD addressing circuitry and which is disposed on or adjacent the substrate 11 between the substrate and the internal polariser 31. The substrate 25 carries a pixel structure defining layer, for instance in the form of a 2D array of electrodes. Examples of different configurations for defining different pixel configurations are shown at 34 and 35. Suitable colour filters (not shown) may also be provided. The arrangement 34 comprises a conventional rectangular array of electrodes defining a corresponding array of pixels. The arrangement 35 defines an arrangement of the type disclosed in EP 0 625 861 such that adjacent columns of pixels are horizontally substantially contiguous.

The substrate 12 carries a parallax structure defining layer 36 in the form of parallel vertically extending column electrodes. Examples of electrode arrangements are described hereinafter.

The polarisers 30 and 31 have substantially orthogonal polarising directions. Similarly, the polarisers 31 and 32 have orthogonal polarising directions, Operation of the LCD 1 will now be described for the case of the TN liquid crystal effect. Light from an unpolarised Lambertian light source (not shown) is linearly polarised by the input polariser 30 and passes to the liquid crystal layer 3. The pixels of the layer 3 selectively rotate the polarisation of light passing therethrough and the internal polariser 31 analyses the output polarisation from the layer 3 in the known way for LCDs. Light passing through the LCD 1 is thus spatially modulated with spatially multiplexed 2D images.

In the autostereoscopic 3D mode, the LCD 2 is controlled so that transmissive slits 4 are provided and are separated by horizontally contiguous opaque regions such as 37 and 38. In particular, the region 4 rotates the linearly polarised light from the polariser 31 by an amount which is preferably 90 degrees so that the output light passes through the output polariser 32. The regions 37 and 38 are controlled so as not to rotate the polarisation of light from the internal polariser 31 so that the output polariser 32 blocks the light.

The transmissive slit 4 is effectively aligned with pixel columns indicated at 39, 40 and 41. The LCD 2 thus acts as a parallax barrier and provides a number of output light cones of wedge-shape (typically two) in which light from the pixel columns 39, 40 and 41 is directed. This arrangement is repeated with the relative pitches of the pixel columns of the LCD 1 and the pixels of the LCD 2 being such that a viewpoint corrected display is provided and results in the viewing zones and viewing windows described hereinbefore. An observer whose eyes are disposed in two adjacent viewing zones therefore sees an autostereoscopic 3D image. Each eye of the observer sees typically half of the pixels of the LCD 1 so that the individual 2D images typically have half of the spatial resolution of the LCD 1.

In the 2D mode, the layer 36 causes the whole of the liquid crystal layer 14 to be switched to a substantially uniformly transmissive state, The parallax barrier thus "disappears" and the LCD 2 becomes substantially invisible to an observer. Thus, both eyes of the observer see the whole of the LCD 1 which may therefore display 2D images at the full spatial resolution of the LCD 1. The absence of opaque regions such as black masks or opaque electrodes in the LCD 2 substantially eliminates Moire patterns caused by beating with the structure of the LCD 1. The ability to produce a clear unadulterated barrier state permits a full resolution 2D mode which is artefact free to be provided.

The display shown in FIG. 10 differs from that shown in FIG. 9 in that the internal polariser 31 is disposed between the substrate 11 and the liquid crystal layer 14. Such an arrangement may be favoured by fabrication requirements and operates in the same way as the display of FIG. 9.

FIG. 11 illustrates an arrangement in which the internal polariser 31 is omitted and the layer 14 comprises FLC incorporating a dye which is aligned with the liquid crystal in a guest-host arrangement. The absorbtion performed by the dye eliminates the need for an internal polariser.

Light from the unpolarised source is polarised by the input polariser 30 and modulated by the liquid crystal layer 3. Depending on the required grey scale level, the pixels of the liquid crystal layer 3 change the input light to proportions of wanted (W) and unwanted (UW) light polarisations. In order for the grey scale content to be visible, the proportion of unwanted polarisation must be extinguished for all barrier pixels and this is ensured by the output polariser 32. The proportion of wanted polarisation must also be extinguished for the pixels of the layer 14 which are switched to the opaque state but must be transmitted by the pixels switched to the clear or transmissive state. This is achieved by the effect of the dyed FLC in the layer 14.

The output polarisation of a standard landscape orientated panel TN active matrix LCD display is shown typically at 45° to horizontal as shown in FIG. 12. To make the best use of this light without unnecessary losses, it is preferable to configure the LCD 2 using the FLC effect as illustrated in the bottom half of FIG. 11. The polarisation of the LCD 1 is aligned with the polarisation of the LCD 2 at their interface. The polarisers across the LCD 2 are substantially orthogonal. In this case, as illustrated, the rubbing direction of the FLC alignment layer is at substantially 22.5 to the horizontal and the FLC with usual cone angle of 45° (tilt angle 22.5°) is used. In this mode, the FLC is switchable between two stable states in which the LC molecule is aligned in the directions of the lines D1 and D2. In one state (off), the LC molecules are aligned with the input polarisation so that the LC layer has no net effect and the input light is extinguished by the output polariser. In the other state (on), the LC molecules are switched to D2 and in this position the anisotropic molecule functions as a waveplate which rotates the plane of polarisation of the input light so as to allow substantial transmission of the input light through the LCD 2. Parallel polarisers across the LCD 2 will give less contrast but higher transmission.

FIG. 13 illustrates the preferred arrangement for the dyed FLC embodiments. The LCD 1 is configured as above but in this case the LCD 2 uses an FLC which incorporates a dichroic dye, preferably a black dichroic dye in a guest-host configuration. In this case the FLC has an unusually high tilt angle of 45 degrees. This is so that, in switching from D1 to D2, the FLC switches between being aligned with and being orthogonal to orientations of the input polarisation state. This maximises the difference between the on and off states in this embodiment which does not require an internal polariser.

FIG. 14 illustrates that other tilt angles including the standard 22.5° are possible, but in these cases the light transmission is reduced compared with that shown in FIG. 13.

The LCD 1 may, for instance, be of the twisted nematic (TN) active matrix type with the black mask 33 controlling the aperture of the pixels. The LCD 1 for image display may be replaced by other types of devices, such as plasma, plasma addressed liquid crystal (PALC), Field Emission Display and electroluminescent devices.

The display shown in FIG. 15 differs from that shown in FIG. 10 in that the layer 34, 35 is disposed between the liquid crystal layer 3 and the substrate 11 whereas the black mask 33 is disposed between the layer 3 and the substrate 25.

FIG. 16 illustrates an autostereoscopic 3D display of the micropolariser type disclosed in EP 0 721 132. The LCD 2 differs from that, for instance, shown in FIG. 15 in that it has its own input polariser 40 and output substrate 12 but omits the output polariser 32. A lenticular sheet 41 comprising an array of parallel evenly spaced converging lenticules is disposed on the output face of the substrate 12 to form a backlight. The LCD 1 of FIG. 16 differs from that of FIG. 9 in that it has no input or output polariser but has its own substrates 25 and 26.

The LCD 2 receives light 5 from an unpolarised Lambertian light source 5 which is polarised by the input polariser 40. In the 3D mode of operation, the contiguous backlight pixel structure defining layer 36 forms a plurality of contiguous pixels within the liquid crystal layer 14 which are elongate, vertical and parallel with alternate pixels supplying output light of orthogonal linear polarizations. The lenticular sheet 41 generates the viewing zones by directing light from the layer 14 into contiguous light cones or wedges which are modulated by the pixels of the LCD 1.

The display shown in FIG. 16 may be used to track movement of an observer so that the viewing zones or windows are maintained at the eyes of the observer, who may therefore perceive a 3D image throughout an enlarged viewing region compared with untracked displays. The pixels of the LCD 2 are controlled in response to the position of the observer as detected by an observer tracking system. The adjacent orthogonally polarising pixels are effectively moved so that the viewing windows track movements of the observer.

In the 2D mode, the pixels of the LCD 2 are controlled so as to provide light of uniform polarisation across the LCD 2. The observer may therefore view a 2D image with the full spatial resolution of the LCD 1.

Figure 17:
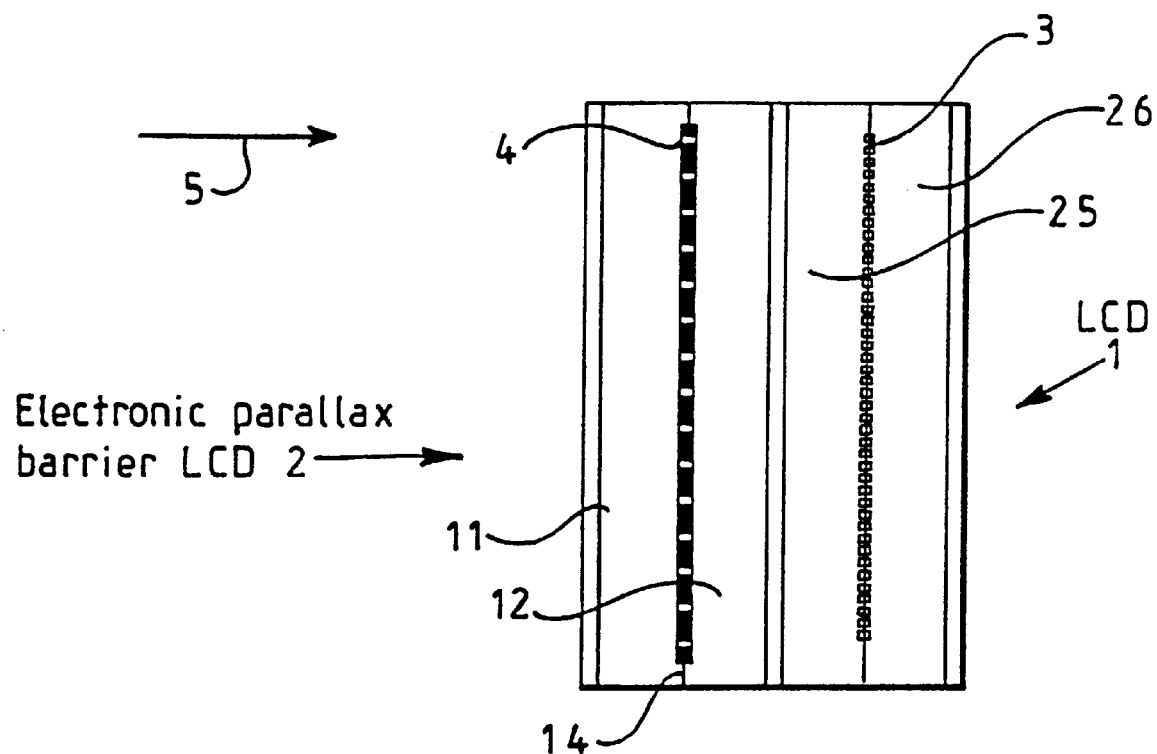

The display shown in FIG. 17 differs from that shown in FIG. 4 in that the optical order of the LCD 1 and the LCD 2 is reversed. This arrangement therefore acts as a rear parallax barrier 3D autostereoscopic display but otherwise operates in the same way as the display of FIG. 4. Similarly, FIG. 18 illustrates a display which differs from that of FIG. 8 in that it is a rear parallax barrier display.

Figure 19:
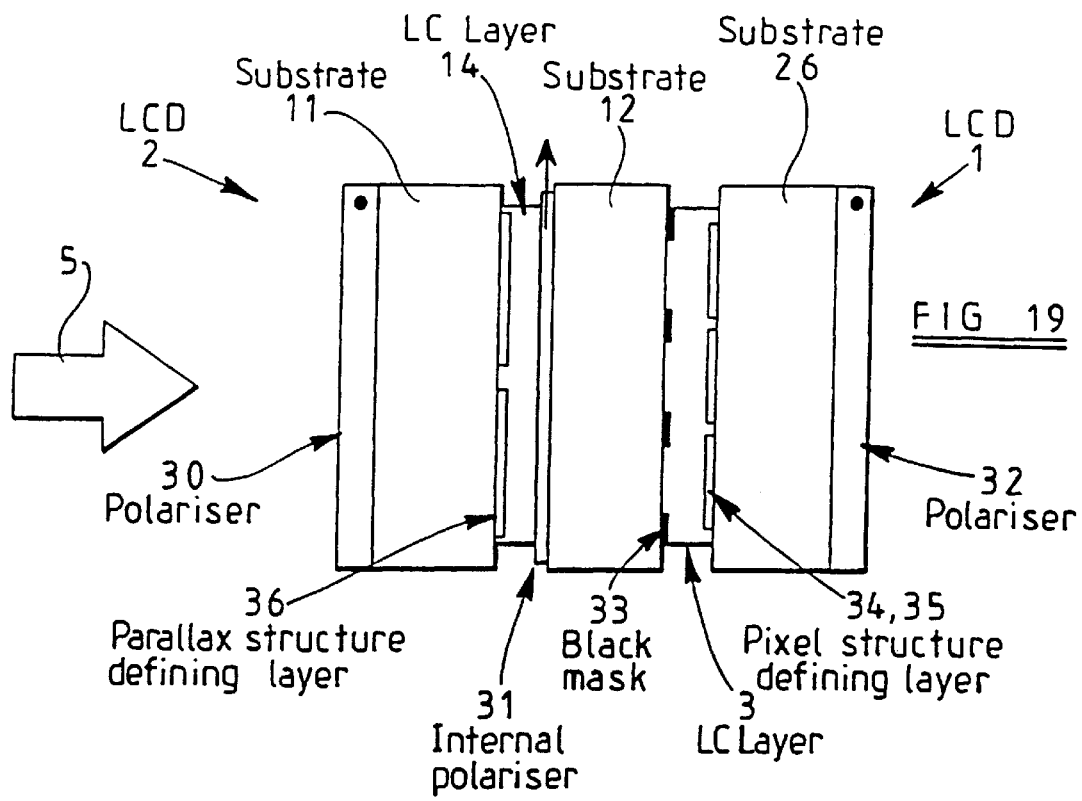

FIG. 19 illustrates the structure of the display of FIG. 18, which structure differs from that of FIG. 9 in the order of components. Operation is as described with respect to FIG. 9.

Figure 20:
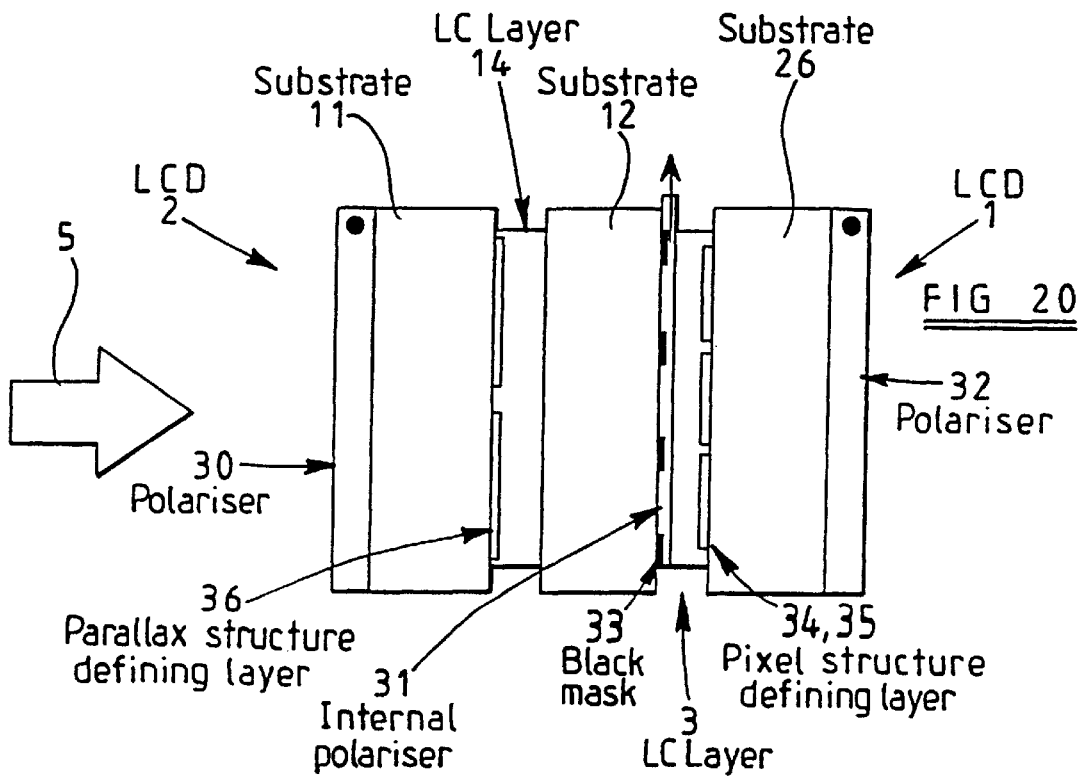

The display shown in FIG. 20 differs from that shown in FIG. 19 in that the internal polariser 31 is disposed on the other side of the substrate 12.

Figure 21:
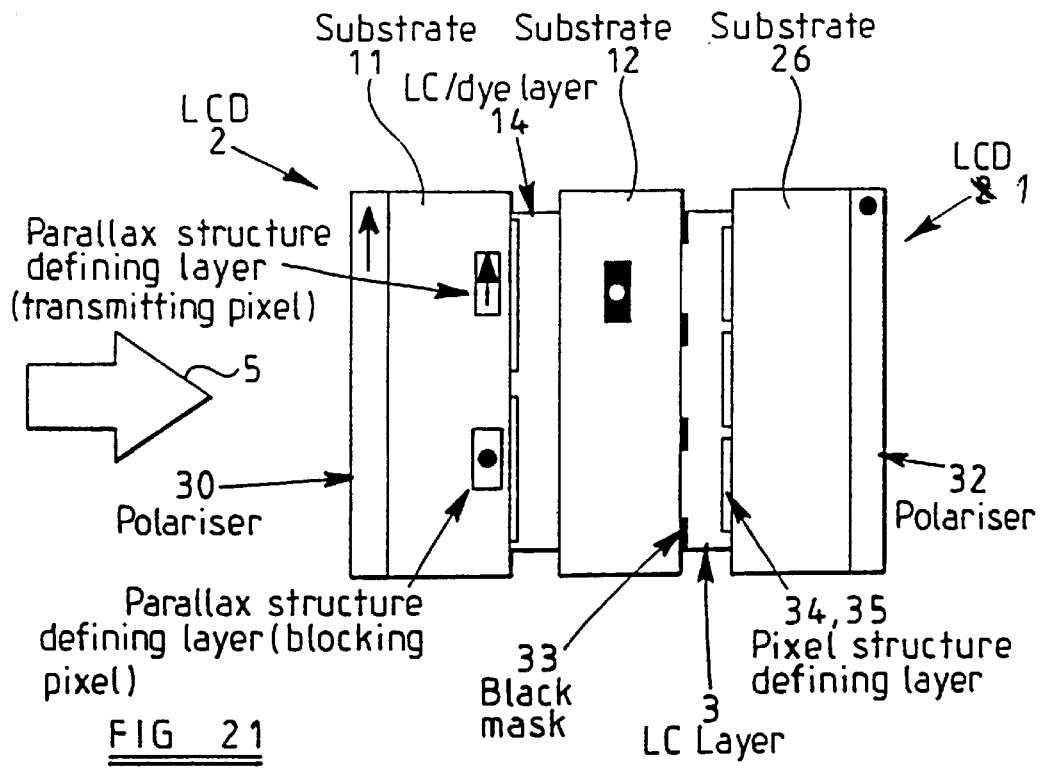

FIG. 21 illustrates a display which differs from that shown in FIG. 19 in that the internal polariser 31 is omitted and the liquid crystal layer 14 contains a dye in a guest-host arrangement. Operation of the display shown in FIG. 21 is the same as that shown in FIG. 11.

Figure 22:
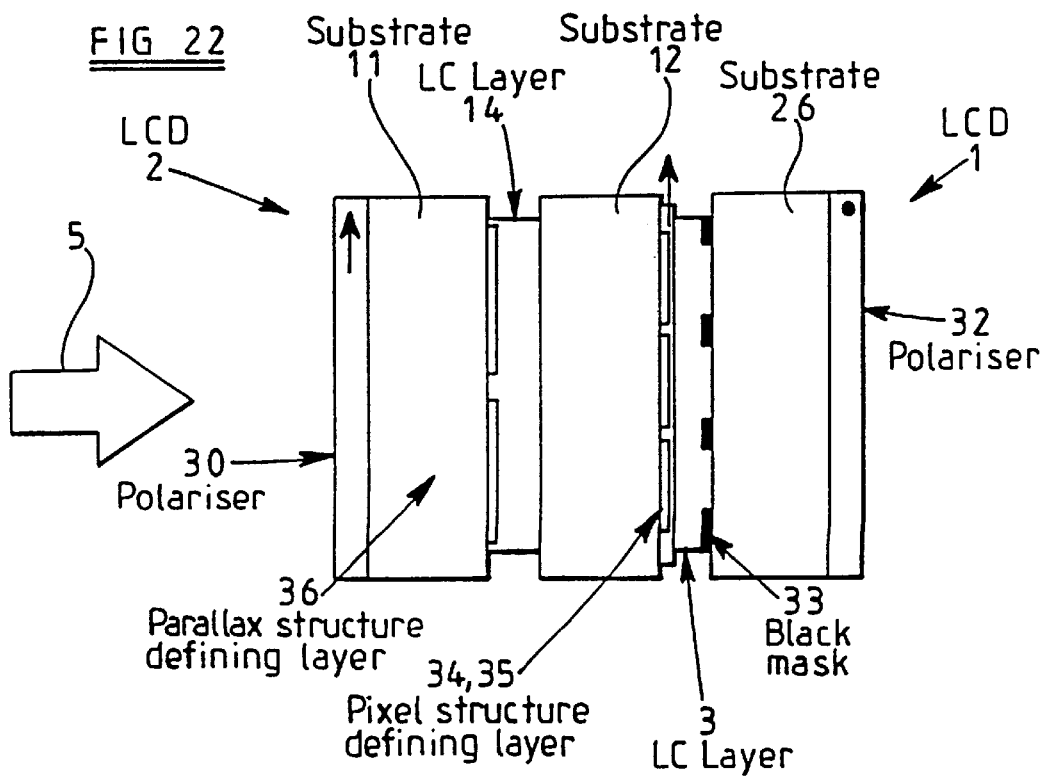

FIG. 22 shows a display which differs from that shown in FIG. 20 in that the positions of the layer 34, 35 and the black mask 33 are interchanged.

FIG. 23 shows a display which differs from that shown in FIG. 21 in that the layer 14 comprises a liquid crystal layer switchable reflector. Thus, light which would be absorbed by opaque pixels in the LCD 2 of FIG. 21 is reflected by the layer 14 in the display of FIG. 23 for reuse. The efficiency of light use is therefore improved.

FIGS. 24, 25 and 26 illustrate embodiments in which the LCD 2 is implemented with a reflective as opposed to an absorptive barrier. This can improve the overall light efficiency of the rear parallax element embodiments.

In FIG. 24, the input light is converted to linear polarisation by the polariser 30, then to circular polarisation by a wideband quarter waveplate 50. The LCD 2 has a layer 51 comprising a chirped pitch cholesteric switchable reflector. In the barrier mode, the layer has regions of cholesteric reflector and clear (non-cholesteric) states. Switching between these states is accomplished as described hereinbefore. Circular polarisation light impinging on the cholesteric reflector is reflected whereas that impinging on the clear parts is transmitted. The transmitted light is then converted to linear polarisation by a quarter waveplate 52 so as to match the required input polarisation state of the subsequent LCD 1. The cholesteric state has a chirped pitch in order to reflect circular polarisation over both a wide angle and a wide range of wavelengths.

The embodiment of FIG. 25 differs from that of FIG. 24 by an alternative position for the linear polariser.

In the embodiment of FIG. 26, a layer 51a which contains a wide band diffractive reflector is used as the parallax generating element. The sheet reflector is enabled/ disabled in regions required to be transmissive (so as to form a parallax SLM) by controlling the orientation of adjacent anisotropic LC molecules by an electric field in the manner described hereinbefore. The grating is disabled by switching the adjacent LC layer so that there is substantially no refractive index difference between the oriented adjacent LC and the diffractive reflector. This effectively washes out the grating which in these regions becomes invisible. In enabled regions, the adjacent LC is switched to an orientation in which there is a refractive index difference between the grating and the LC,. thereby enabling the reflective function of the grating.

FIG. 27a illustrates an electrode arrangement for the LCD 2 of FIG. 5. A continuous plane counter electrode 60 is disposed on the substrate 11 whereas the parallax structure defining layer 36 has the form of an electrode having formed therein a plurality of slits for corresponding to the parallax barrier slits. The arrangement permits switching between the clear mode and the barrier mode in which the positions of the slits are fixed. The LCD may be switched from one state to another by applying a suitable signal (V on/off).

FIG. 27b illustrates an electrode arrangement for the LCD 2 having regions of shared electrodes which permits 2D/3D operation in a number of configurable zones. Such SLMs are suitable for use with mechanical tracking, for instance as disclosed in British Patent Application No. 9619097.0.

The electrode arrangement shown in FIG. 28, comprises a continuous plane electrode 60 facing a plurality of parallel uniformly spaced column electrodes such as 61. The pixels and interelectrode gaps may be switched individually by supplying suitable signals V1, V2, . . . Vn to the individual electrodes which allows the slit locations of the barrier in the 3D mode to be moved so as to perform electronic tracking, for instance as described hereinafter. Also, full resolution 2D zones which extend the full height of the display may be combined with 3D zones by suitably controlling the signals supplied to the electrodes 61.

FIG. 29 illustrates an XY passive matrix addressing arrangement comprising column electrodes such as 61 and row electrodes such 62. Strobe signals Vr1, Vr2, . . . Vrn may be applied in sequence to the electrodes 62 so as to enter data in accordance with the column signals V1, . . . Vn a row at a time so as to refresh the mode of the display. The gaps between pixels may be controlled by fringing fields or by "frame ahead gap blanking". Alternatively, the gaps may be switched by different strobe and data voltages applied to the same row and column electrodes and optionally to other row and column electrodes without altering the state of the adjacent pixels.

The electrode arrangement illustrated in FIG. 29 may be used to provide any desired configuration of 2D and 3D image zones simultaneously. For instance, FIG. 30 illustrates a 3D background 63 having 2D image zones 64, 65 and 66. In addition, the 2D zone 66 has an inset 3D image zone 67. In the 3D zones, the corresponding pixels of the LCD 2 are controlled to provide parallax barriers-whereas the pixels in the regions of the 2D zones are controlled to be transmissive.

The presence of the parallax barrier over the 3D regions gives a difference in intensity between the 2D and 3D zones which may be compensated for electronically in the drive signal. Compensation by setting the 2D zones to an intermediate attenuating grey level may be used to achieve the same effect but is not appropriate for the LCD 2 when using binary switching effects, for instance in the case of standard FLCs. The presence of a border around an inset 2D or 3D image zone prevents vertical parallax caused by the separation of the LCDs 1 and 2 seen by a viewer above or below the axis of the display from making the edge pixels of an inset zone appear in the wrong image zone.

FIG. 31 shows a temporally multiplexed 3D autostereoscopic display in which the image LCD is a fast SLM, for instance of the FLC type, and the parallax barrier LCD is likewise of the fast switching type such as FLC. The middle part of FIG. 31 illustrates the generation of a left eye viewing window 70 during a first field in which image data of a first 2D image are displayed by the LCD 1. The windows are produced in a plurality of lobes as is known in 3D display technology. The slits 4 of the parallax barrier formed by the LCD 2 are located in a first lateral position with respect to the pixels of the LCD 1.

The lower part of FIG. 31 illustrates generation of right eye viewing windows 71. In this case, a second field of image data representing an image to be viewed by the right eye of the observer is displayed by the LCD 1. The LCD 2 is controlled so that the pixels 4 have a different lateral position with respect to the pixels of the LCD 1.

FIG. 32 illustrates a temporally multiplexed display which differs from that shown in FIG. 31 in that the optical order of the fast SLM 1 and the dynamic parallax barrier LCD 2 are reversed.

FIG. 33 illustrates use of the steerable backlight shown in FIG. 16 in a temporally multiplexed display. 2D image data are supplied in sequence to the fast SLM 1 and the LCD 2 is controlled such that light corresponding to each 2D image is directed to a respective one of the viewing windows 70 and 71.

FIG. 34 illustrates an arrangement combining spatial and temporal multiplexing to provide four viewing windows 72 to 75. During each field, two spatially multiplexed 2D images are displayed by the SLM 1. Thus, two viewing windows 73 and 75 are provided in one field whereas two viewing windows 72 and 74 are provided in the next field.

The display of FIG. 35 differs from that shown in FIG. 34 in that the optical order of the SLM 1 and the barrier 2 is reversed.

Simultaneous tracking of multiple observers is also possible. For instance, FIG. 36 illustrates a display of the type shown in FIG. 9 for providing a pair of viewing windows for a first observer and another pair of viewing windows for a second observer, The creation of the individual viewing windows is shown in the middle and lower parts of FIG. 36.

The slits in the two fields of the displays shown in FIGS. 32 and 35 need not be contiguous with each other. Further, the width of the slits can be electrically adjusted to control brightness against viewing window quality, which is a measure of 3D crosstalk level. FIG. 38 illustrates this for a pixel aperture 76 of rectangular shape and for a narrow slit 77 and a wide slit 78. The variation of intensity with observer position for the slits 77 and 78 is illustrated at 79 and 80, respectively. The profile 79 shows that the intensity of light is reduced but the window shape is better. For the wider slit 78, the corresponding intensity profile 80 shows greater intensity but a worse window shape.

FIG. 37 illustrates different tracking modes for an LCD 2 of the type shown in FIG. 5. Each slit is made up of a number of pixels and will be illustrated for the case of four pixels. The four pixels are controlled so as to be transparent. In order to track an observer as illustrated in the upper part of FIG. 37, the pixels may be switched such that one pixel at one edge of the slit is switched to black as one pixel next to the other edge of the slit is switched to white. This provides one step tracking and minimises flicker. Optical performance is optimum for one step tracking in that undesirable visible artefacts are minimised and this therefore represents the normal operation.

The middle part of FIG. 37 illustrates two step tracking in which two pixels at one edge are switched to black as two pixels adjacent the other edge are switched to white. This mode of tracking allows for higher speed observer movements to be accommodated.

The lower part of FIG. 37 illustrates jump tracking in which no pixels remain clear i.e. the location of the transmissive slit jumps so that there is no overlap between one slit position and the next slit position. This mode allows for extreme observer movement and for error recovery.

It is thus possible to provide devices and displays which may be used in 3D work stations, medical imaging, scientific visualisation, video games, video phones and 3D TV.

What is claimed is:

1. A spatial light modulator, comprising a modulator region which is switchable between a clear mode, in which the region is of substantially uniform transmissivity, and a barrier mode, in which the region has a plurality of evenly spaced parallel transmissive strips extending in a first direction and separated by continuous substantially opaque sub-regions.

2. A modulator as claimed in claim 1, wherein the region comprises a plurality of elongate picture elements extending in the first direction.

3. A modulator as claimed in claim 2, wherein the picture elements are switchable together to opaque to define the sub-regions and are spaced apart to define the transmissive strips.

4. A modulator as claimed in claim 2, wherein the picture elements define gaps therebetween, which gaps are switchable between transmissive and opaque independently of the picture elements.

5. A modulator as claimed in claim 2, comprising a liquid crystal device including a first layer of liquid crystal material, wherein the picture elements are defined by addressing electrodes.

6. A modulator as claimed in claim 5, wherein the addressing electrodes comprise a passive matrix addressing arrangement.

7. A modulator as claimed in claim 5, wherein the picture elements define gaps therebetween, which gaps are switchable between transmissive and opaque independently of the picture elements, and wherein the gaps are switchable by means of fringing fields.

8. A modulator as claimed in claim 1, wherein the region comprises a two dimensional array of picture elements, each of which is independently switchable between transmissive and opaque and which define gaps therebetween, which gaps are switchable between transmissive and opaque.

9. A modulator as claimed in claim 8, wherein the gaps are independently switchable between transmissive and opaque.

10. A modulator as claimed in claim 9, comprising a liquid crystal device including a first layer of liquid crystal material, wherein the picture elements are defined by addressing electrodes.

11. A modulator as claimed in claim 10, wherein the addressing electrodes comprise a passive matrix addressing arrangement.

12. A modulator as claimed in claim 10, wherein the gaps are switchable by means of fringing fields.

13. A modulator as claimed in claim 8, comprising a liquid crystal device including a first layer of liquid crystal material, wherein the picture elements are defined by addressing electrodes.

14. A modulator as claimed in claim 13, wherein the addressing electrodes comprise a passive matrix addressing arrangement.

15. A modulator as claimed in claim 13, wherein the gaps are switchable by means of fringing fields.

16. A modulator as claimed in claim 1, comprising a liquid crystal device including a first layer of liquid crystal material.

17. A modulator as claimed in claim 16, wherein the first layer comprises ferroelectric liquid crystal material.

18. A modulator as claimed in claim 16, wherein the first layer comprises anti-ferroelectric liquid crystal material.

19. A modulator as claimed in claim 16, wherein the first layer comprises super-twisted nematic liquid crystal material.

20. A modulator as claimed in claim 16, wherein the first layer includes an anisotropic dye.

21. A directional display, comprising a modulator as claimed in claim 16 cooperating with an image display.

22. A display as claimed in claim 21, wherein the image display comprises a further spatial light modulator.

23. A display as claimed in claim 22, wherein the further spatial light modulator comprises a further liquid crystal-device including a second layer of liquid crystal material.

24. A display as claimed in claim 23, comprising first and second substrates with the first layer therebetween and a third substrate with the second layer between the second and third substrates.

25. A display as claimed in claim 23, comprising a single polariser between the first and second layers.

26. A modulator as claimed in claim 1, wherein the opaque sub-regions are reflective.

27. A directional display, comprising a modulator as claimed in claim 1 cooperating with an image display.

28. A display as claimed in claim 27, wherein the image display comprises a further spatial light modulator.

29. A directional light source, comprising a modulator as claimed in claim 1 cooperating with a diffuse light source.

30. A light source as claimed in claim 29, further comprising a lenticular sheet having lenticules extending in the first direction.

31. A spatial light modulator, comprising a modulator region which is switchable between a first mode in which the region is arranged to supply light of a substantially uniform first polarisation, and a second mode, in which the region is arranged to supply light of the first polarisation in a plurality of evenly spaced parallel strips and to supply light of a second polarisation, different from the first polarisation, in continuous sub-regions which separate the strips.

32. A modulator as claimed in claim 31, wherein the second polarisation is orthogonal to the first polarisation.

* * * * *